(12) United States Patent
Shintani

(10) Patent No.: US 8,508,858 B2
(45) Date of Patent: Aug. 13, 2013

(54) LENS BARREL

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 419 days.

(21) Appl. No.: 12/964,742

(22) Filed: Dec. 10, 2010

(65) Prior Publication Data

US 2011/0141589 A1 Jun. 16, 2011

(30) Foreign Application Priority Data

Dec. 15, 2009 (JP) .................................. 2009-283652

(51) Int. Cl.
*G02B 15/14* (2006.01)

(52) U.S. Cl.
USPC .......................................... 359/700; 359/704

(58) Field of Classification Search
USPC .................. 359/700, 701, 704, 699, 826, 830
See application file for complete search history.

(56) References Cited

U.S. PATENT DOCUMENTS

| | | | |
|---|---|---|---|
| 5,652,922 A | 7/1997 | Kohno | |
| 5,892,988 A | 4/1999 | Uno | |
| 5,956,187 A | 9/1999 | Shintani | |
| 6,035,136 A | 3/2000 | Hayashi et al. | |
| 7,466,503 B2 | 12/2008 | Takenaka et al. | |

FOREIGN PATENT DOCUMENTS

| | | |
|---|---|---|
| JP | H2-213813 A | 8/1990 |
| JP | H07-027963 A | 1/1995 |
| JP | H09-211290 A | 8/1997 |
| JP | H10-288731 A | 10/1998 |
| JP | H11-174305 A | 7/1999 |
| JP | 2000-131588 A | 5/2000 |
| JP | 2003-021776 A | 1/2003 |
| JP | 2003-66308 A | 3/2003 |
| JP | 2004-184587 A | 7/2004 |
| JP | 2005-140848 A | 6/2005 |
| JP | 2005-284243 A | 10/2005 |
| JP | 2006-317809 A | 11/2006 |
| JP | 2007-271792 A | 10/2007 |
| JP | 2008-51914 A | 3/2008 |
| JP | 2009-216881 A | 9/2009 |

OTHER PUBLICATIONS

Office Action for the corresponding Japanese Patent Application No. 2009-283652, dated Jun. 12, 2012.

*Primary Examiner* — Alicia M Harrington
(74) *Attorney, Agent, or Firm* — Shinjyu Global IP

(57) ABSTRACT

A lens barrel includes an optical system, a first frame, a second frame, a third frame, a rectilinear frame and a cam frame. The first frame supports the optical system. The second frame supports the optical system and restricts rotation of the first frame about an optical axis of the optical system. The third frame supports the optical system and restricts rotation of the second frame about the optical axis of the optical system, and the rectilinear frame restricts rotation of the third frame about the optical axis of the optical system.

34 Claims, 20 Drawing Sheets

LENS BARREL

CROSS-REFERENCE TO RELATED APPLICATIONS

This application claims priority under 35 U.S.C. §119 to Japanese Patent Application No. 2009-283652 filed on Dec. 15, 2009. The entire disclosure of Japanese Patent Applications No. 2009-283652 is hereby incorporated herein by reference.

BACKGROUND

1. Technical Field

The technology disclosed herein relates to a lens barrel for supporting an optical system.

2. Background Information

Digital cameras that make use of image sensors such as a Charge Coupled Device (CCD) or Complementary Metal-oxide Semiconductor (CMOS) sensor to convert an optical image into an electrical signal, and record by digitizing the electrical signal, have grown to be popular in recent years.

In the field of digital cameras, the overall size of the camera needs to be reduced in order to make the product more portable. More specifically, a more compact lens barrel has been proposed in order to make the camera body thinner.

With the lens barrel discussed in Japanese Patent Laid-Open Publication No. JP2003-066308, a rotating tube 25 is arranged to guide in the optical axis direction a forward movement tube 26 that supports a first lens group 11, and a first moving tube 20 that supports a second lens group 12. Cam grooves that guide the forward movement tube 26 and the first moving tube 20 are arranged on the outer peripheral part and inner peripheral part of the rotating tube 25.

However, if the forward movement tube 26 and the first moving tube 20 rotate along with the rotating tube 25, the forward movement tube 26 and the first moving tube 20 will not be guided by the cam grooves.

In view of this, an outer rectilinear tube 24 and an inner rectilinear tube 23 are arranged on the outer peripheral side and inner peripheral side of the rotating tube 25 in order to restrict the rotation of the forward movement tube 26 and the first moving tube 20. The outer rectilinear tube 24 and the inner rectilinear tube 23 are coupled to the rotating tube 25 with bayonet coupling so that the outer rectilinear tube 24 and the inner rectilinear tube 23 will move integrally in the optical axis direction with the rotating tube 25. Rotation of the forward movement tube 26 and the first moving tube 20 is restricted by the outer rectilinear tube 24 and the inner rectilinear tube 23, and the forward movement tube 26 and the first moving tube 20 are guided in the optical axis direction by the cam grooves.

If two rectilinear tubes are arranged on the outer peripheral side and inner peripheral side of the rotating tube 25, however, this means more parts are required, which hampers efforts to make the lens barrel more compact. Furthermore, since bayonets must be arranged on the rotating tube 25, the outer rectilinear tube 24, and the inner rectilinear tube 23, the size of the tubes in the optical axis direction becomes larger, which also is contrary to the goal of making the lens barrel smaller in the optical axis direction.

Also, a structure in which the various lens frames are guided by a shaft has been conceived, as disclosed in Japanese Patent Laid-Open Publication No. JP2007-211792. Providing a shaft, though, makes it more difficult to dispose the lens frames efficiently, and so is contrary to the goal of making the lens barrel smaller in the optical axis direction.

SUMMARY

In view of the state of the known technology, a lens barrel disclosed herein comprises an optical system, a first frame, a second frame, a third frame, a rectilinear frame and a cam frame. The first frame supports the optical system. The second frame supports the optical system and restricts rotation of the first frame about an optical axis of the optical system. The third frame supports the optical system and restricts rotation of the second frame about the optical axis of the optical system, and the rectilinear frame restricts rotation of the third frame about the optical axis of the optical system.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

1: Configuration of Digital Camera

Figure 1:
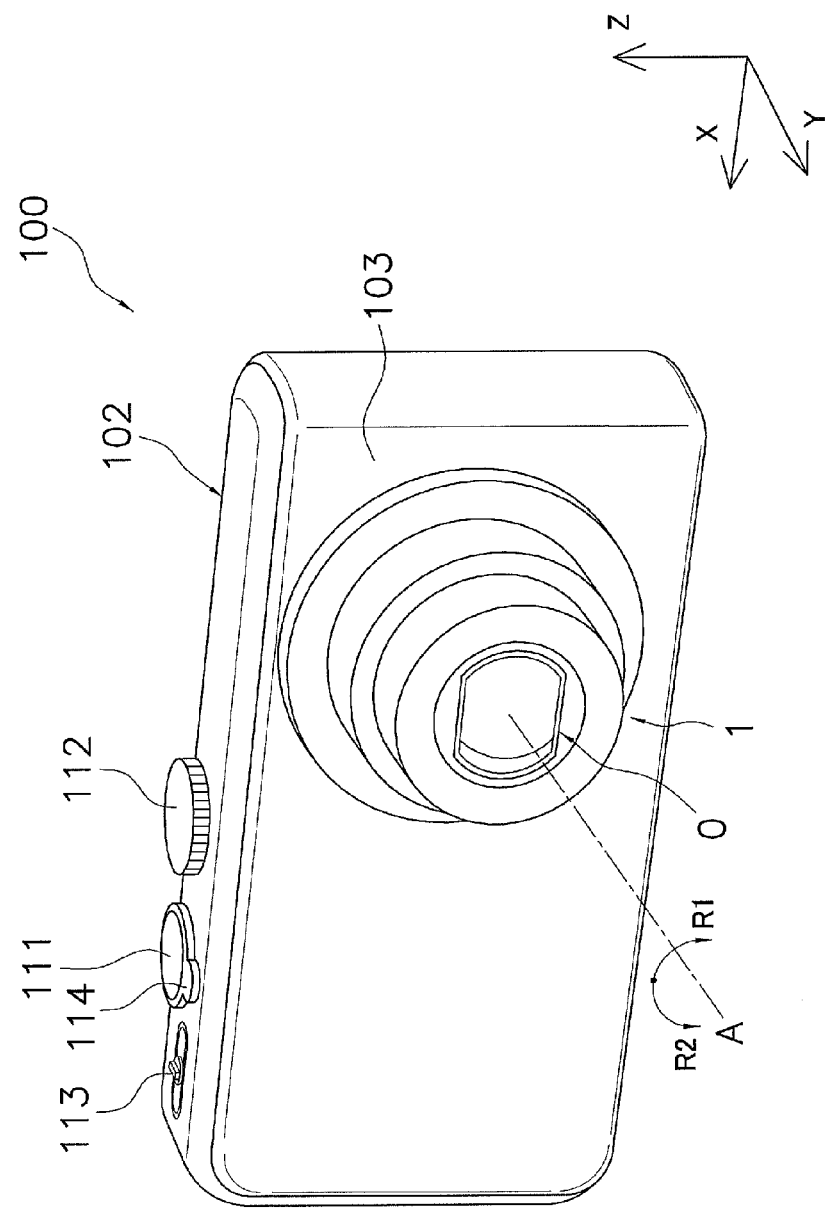
FIG. 1 is a simplified oblique view of a digital camera 100 (imaging state)
Figure 2:
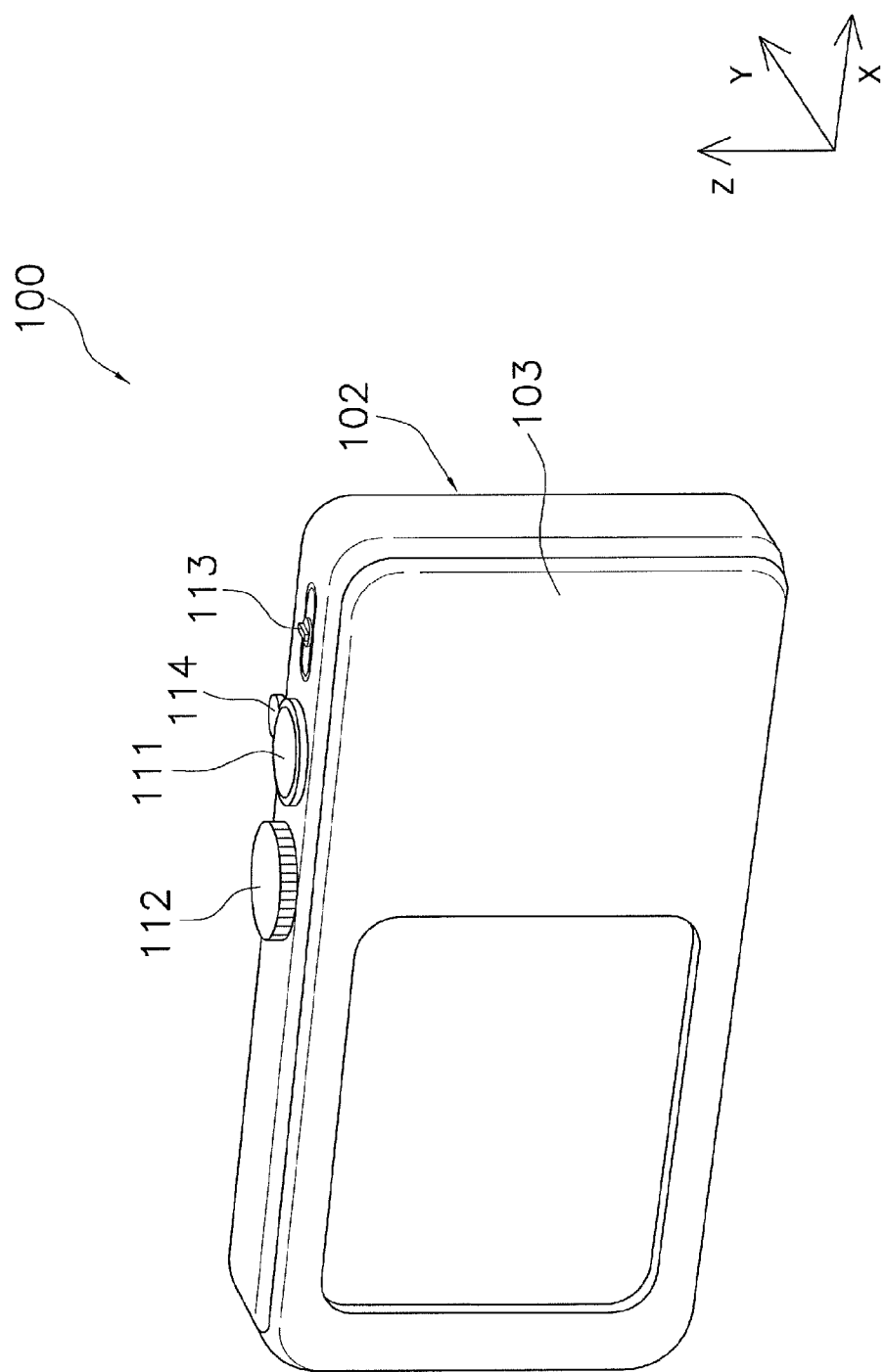
FIG. 2 is a simplified oblique view of a digital camera 100.

The digital camera 100 will now be described through reference to FIGS. 1 and 2. As shown in FIGS. 1 and 2, the digital camera 100 comprises a lens barrel 1 for forming an optical image of a subject, and a camera body 102. FIG. 1 shows the state at the wide angle end of the digital camera 100.

The "wide angle end" here refers to a state in which the focal length of the optical system O (discussed below) is shortest (a state of the greatest field angle), and "telephoto end" refers to a state in which the focal length of the optical system O is longest (a state of the least field angle). A state in which the power is turned on is defined as an imaging state, while a state in which the length of the lens barrel 1 is shortest is defined as a retracted state. In this embodiment, the imaging state corresponds to the state of the optical system O at the wide angle end.

Also, in this embodiment, the X, Y, and Z axes are set with respect to the digital camera 100. The Y axis is set to be parallel with the optical axis A of the optical system O, and the subject side using the digital camera 100 as a reference is termed the Y axis direction positive side. Hereinafter the Y axis direction parallel to the optical axis A shall also be called the optical axis direction. In the landscape orientation shown in FIG. 1, the X axis is set to be parallel with the horizontal direction, and the left side when viewing the digital camera 100 from the subject side is termed the X axis direction positive side. In the landscape orientation shown in FIG. 1, the Z axis is set to be parallel with the vertical direction, and the upper side in the vertical direction is termed the Z axis direction positive side.

As shown in FIGS. 1 and 2, the camera body 102 comprises a housing 103, a release button 111, a control dial 112, a power switch 113, and a zoom adjusting lever 114. The housing 103 is the exterior part of the camera body 102. A base plate 11 (discussed below) of the lens barrel 1 is fixed to the housing 103. The release button 111 is used by the user to input the exposure timing. The control dial 112 is used by the user to make various settings. The power switch 113 is used by the user to turn the digital camera 100 on and off. The zoom adjusting lever 114 is used by the user to adjust the focal length, and is rotatably arranged around the release button 111 with a specific range of angle.

2: Configuration of Lens Barrel

Figure 4:
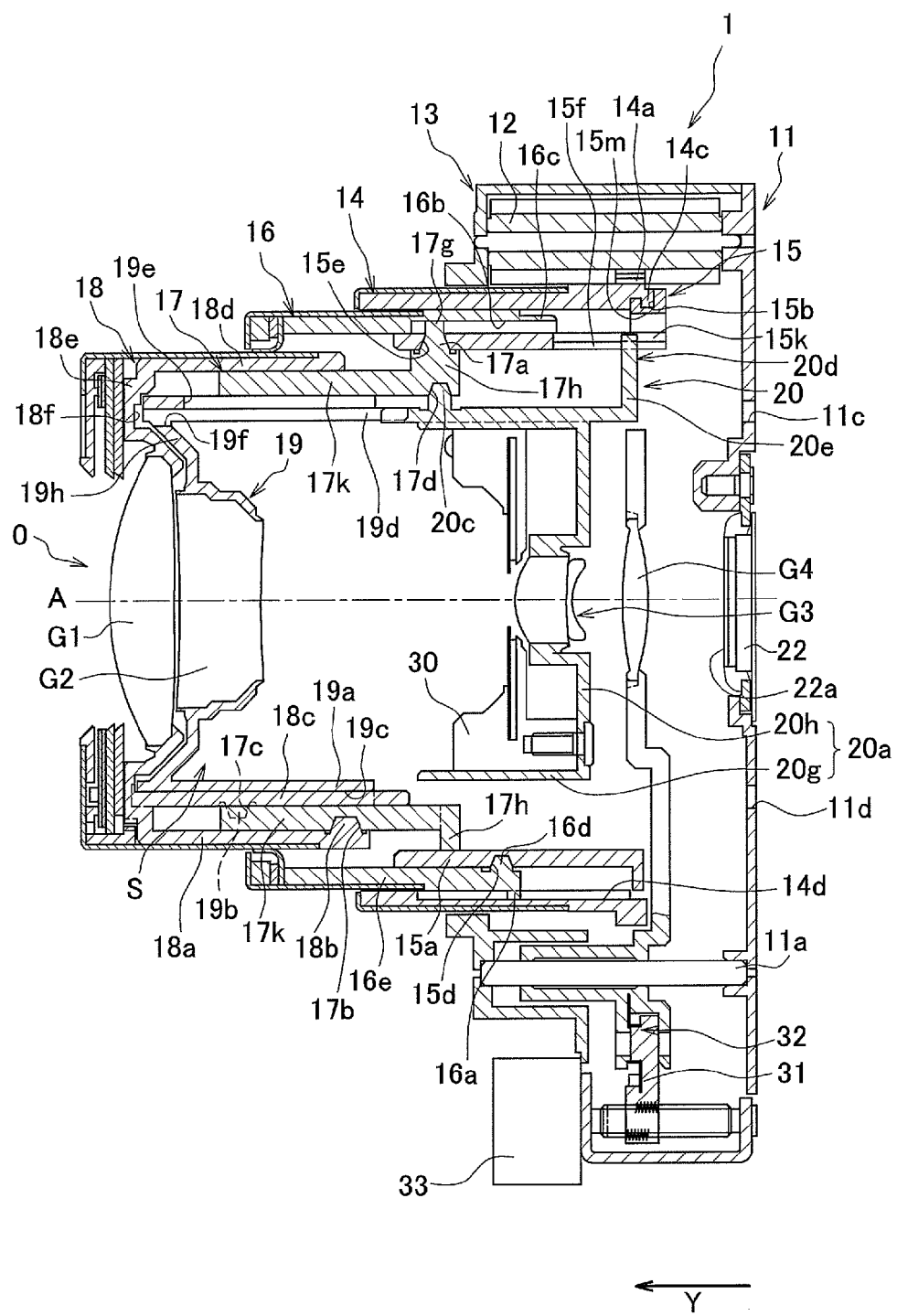
FIG. 4 is a simplified cross section of a lens barrel 1 (wide angle end)
Figure 5:
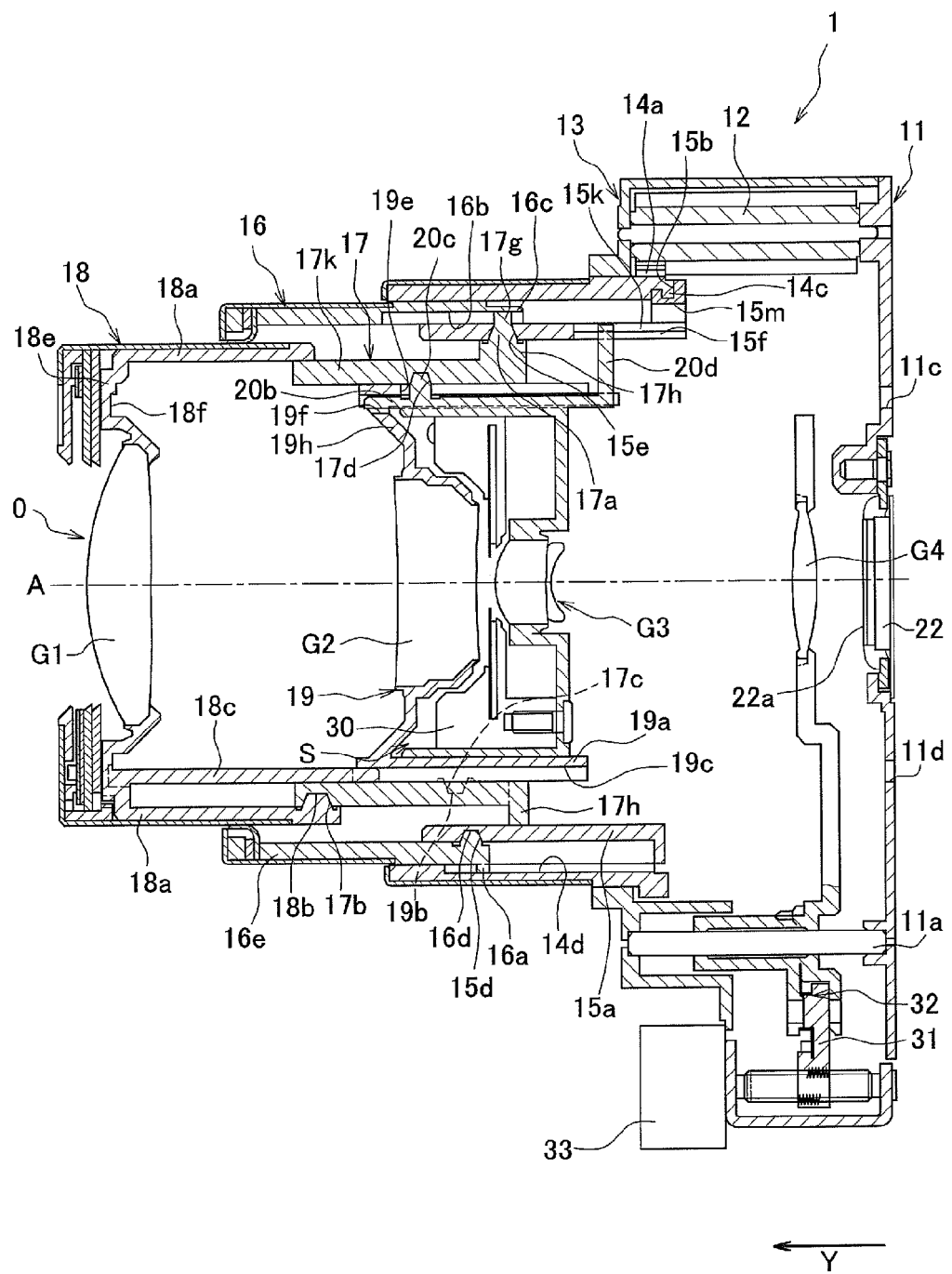
FIG. 5 is a simplified cross section of a lens barrel 1 (telephoto end)
Figure 6:
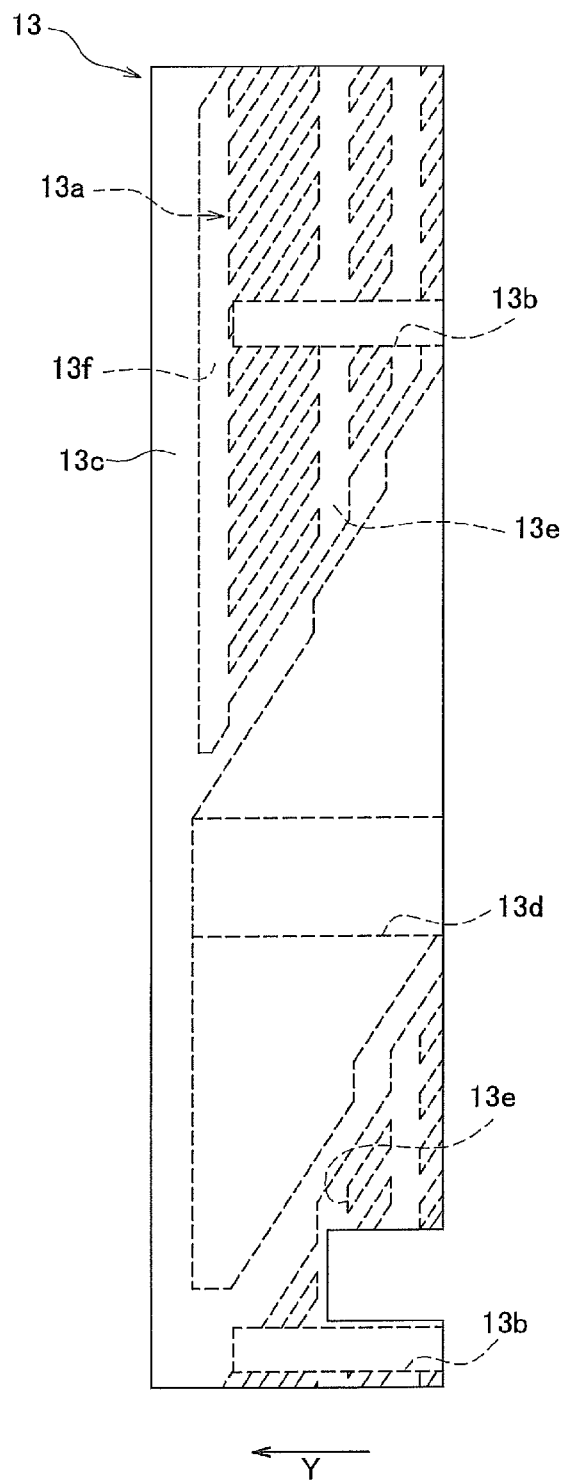
FIG. 6 is a development view of a fixed frame 13 as seen from the inner peripheral side.
Figure 7:
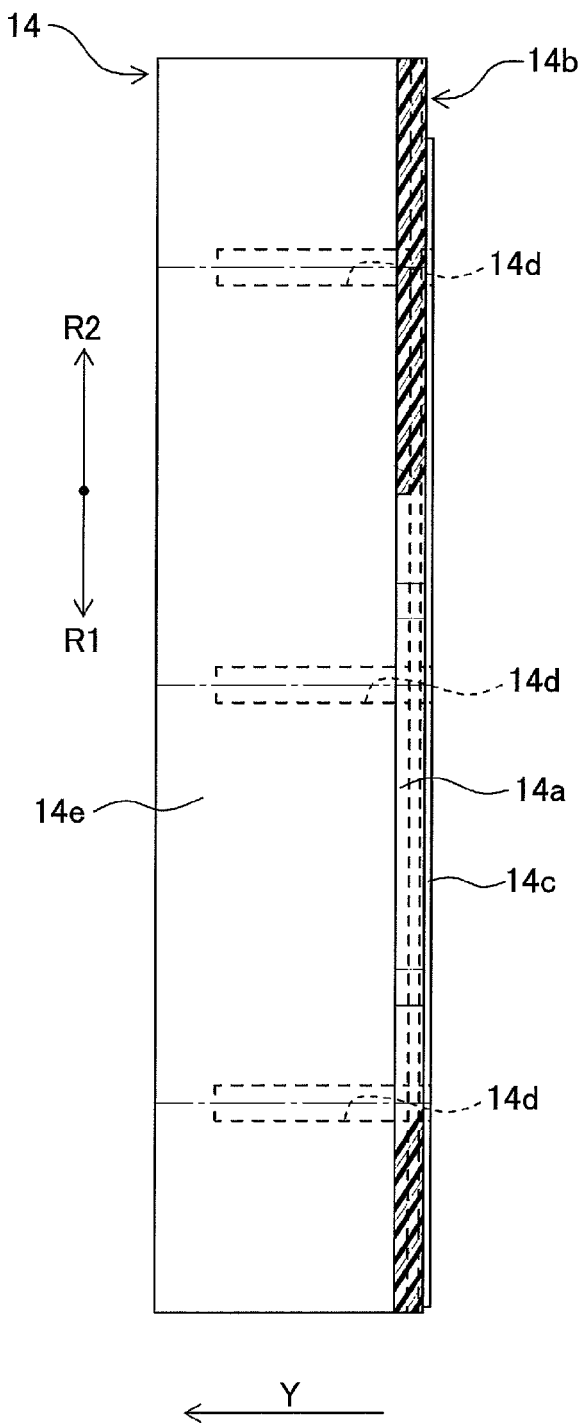
FIG. 7 is a development view of a drive frame 14 as seen from the outer peripheral side.

The overall configuration of the lens barrel 1 will be described through reference to FIGS. 3 to 19. As shown in FIGS. 3 to 19, the lens barrel 1 mainly has the optical system O, the base plate 11 fixed to the camera body, a zoom motor such as a DC motor (not shown), a fixed frame 13, a drive gear 12, a drive frame 14, a rectilinear frame 15, a rotatable frame 16, a cam frame 17, a first lens frame 18 (an example of a first frame), a second lens frame 19 (an example of a second frame), a third lens frame 20 (an example of a third frame), an aperture unit 30, and an imaging element 22. The imaging element 22 is a CMOS image sensor, for example, and as shown in FIGS. 3 to 5, has a light receiving face 22a that receives light that has passed through the optical system O.

The various members will now be briefly described. The base plate 11 and the fixed frame 13 are mounted to the housing 103 of the camera body 102, and constitute the members on the stationary side.

In contrast, the rectilinear frame 15, the first lens frame 18, the second lens frame 19, and the third lens frame 20 are arranged to move in a straight line without rotating with respect to the fixed frame 13. The drive frame 14, the rotatable frame 16, and the cam frame 17 are arranged to move in a straight line while rotating with respect to the fixed frame 13.

Figure 3:
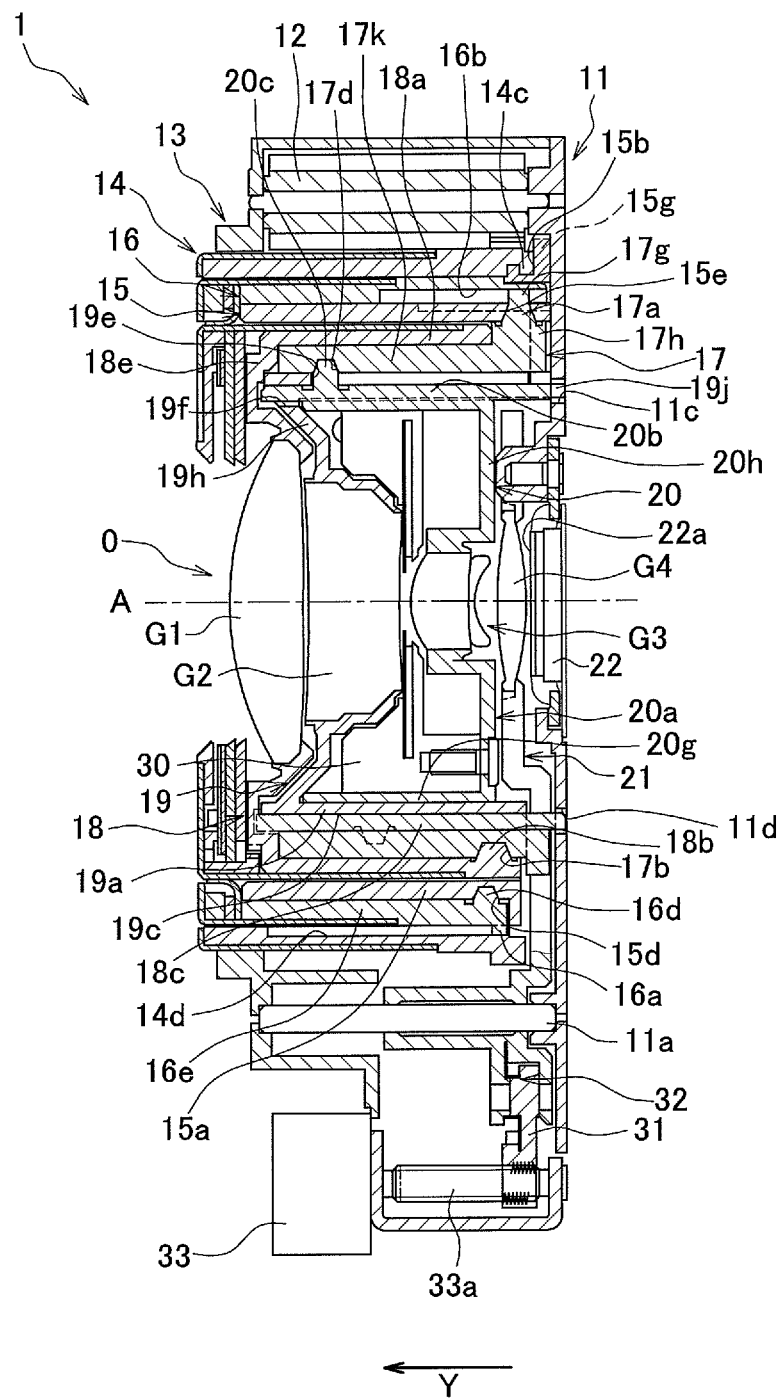
FIG. 3 is a simplified cross section of a lens barrel 1 (retracted state)

As shown in FIG. 3, in a retracted state, the drive frame 14, the rectilinear frame 15, the rotatable frame 16, the cam frame 17, the first lens frame 18, the second lens frame 19, and the third lens frame 20 are housed more or less in the fixed frame 13. Meanwhile, as shown in FIGS. 4 and 5, at the wide angle end and the telephoto end, the drive frame 14, the rotatable frame 16, and the first lens frame 18 are in a state of being advanced from the fixed frame 13, and other frames are housed inside the drive frame 14, the rotatable frame 16, and the first lens frame 18. In other words, the lens barrel 1 is what is known as a three-stage telescoping type of lens barrel.

2.1: Optical System

As shown in FIGS. 3 to 5, the optical system O has a first lens group G1, a second lens group G2, a third lens group G3, and a fourth lens group G4. The first lens group G1 is disposed furthest on the subject side of the optical system O (the Y axis direction positive side). The second lens group G2 is a lens group that receives light that has passed through the first lens group G1, and is disposed on the imaging element 22 side (the Y axis direction negative side) of the first lens group G1. The third lens group G3 is a lens group that receives light that has passed through the G2, and is disposed on the Y axis direction negative side of the second lens group G2. The fourth lens group G4 a lens group that receives light that has passed through the third lens group G3, and is disposed on the Y axis direction negative side of the third lens group G3. The fourth lens group G4 is used to adjust the focus. In other words, the first lens group G1, the second lens group G2, the third lens group G3, and the fourth lens group G4 are disposed in that order starting on the subject side.

The first to fourth lens groups G1 to G4 can each be made up of a single lens, or can be made up of a plurality of lenses.

2.2: Base Plate

The base plate 11 is fixed to the housing of the camera body 102. The imaging element 22 is fixed to the base plate 11. The fixed frame 13 is also fixed to the base plate 11. The base plate 11 and the fixed frame 13 constitute a stationary member. A zoom motor unit is fixed to the stationary member. In a retracted state, the other frames are housed in the space formed by the base plate 11 and the fixed frame 13.

As shown in FIGS. 3 to 5, the base plate 11 has six first holes 11c and three second holes 11d. The first holes 11c and the second holes 11d are arranged to make the lens barrel 1 more compact. More specifically, the first holes 11c are disposed at positions corresponding to second protrusions 19j (discussed below) of the second lens frame 19, and the second holes 11d are disposed at positions corresponding to first guide plates 18c (discussed below) of the first lens frame 18. As discussed below, the second protrusions 19j and the first guide plates 18c are disposed at substantially the same positions in the radial direction, so the first holes 11c and the second holes 11d are also disposed at substantially the same positions in the radial direction. As shown in FIG. 3, the second protrusions 19j, which are part of the second lens frame 19, are inserted into the first holes 11c in a retracted state. Further, the ends of the first guide plates 18c (more precisely, the ends of the first guide plates 18c on the Y axis direction negative side), which are part of the first lens frame 18, are inserted into the second holes 11*d* in a retracted state.

2.3: Fixed Frame

The fixed frame 13 is used to guide the drive frame 14, and is fixed to the base plate 11. Along with the base plate 11, the fixed frame 13 constitutes the stationary member of the lens barrel 1.

As shown in FIGS. 3 to 6, the fixed frame 13 has a substantially tubular fixed frame main body 13*c*, a helicoid portion 13*a*, two first rectilinear grooves 13*b*, one second rectilinear groove 13*d*, a first rotary groove 13*e*, and a second rotary groove 13*f*. The helicoid portion 13*a* and the first rectilinear grooves 13*b* are formed at the inner peripheral part of the fixed frame main body 13*c*. The second rectilinear groove 13*d* is formed by cutting out the end of the fixed frame main body 13*c* on the side where the base plate 11 is attached (the Y axis direction negative side).

The helicoid portion 13*a* is arranged to guide the drive frame 14, and meshes with a helicoid portion 14*b* (discussed below) of the drive frame 14. The helicoid portion 13*a* is mainly used for transition between a retracted state and an imaging state. Rotary motion of the drive frame 14 with respect to the fixed frame 13 is converted by the helicoid portion 13*a* and the helicoid portion 14*b* into linear motion with respect to the fixed frame 13. The helicoid portion 13*a* can also be cam grooves disposed at a substantially equal pitch in the circumferential direction.

The first rectilinear grooves 13*b* and the second rectilinear groove 13*d* are arranged to guide the rectilinear frame 15. First rectilinear prongs 15*c* (discussed below) of the rectilinear frame 15 are inserted into the first rectilinear grooves 13*b*, and a second rectilinear prong 15*h* (discussed below) of the rectilinear frame 15 is inserted into the second rectilinear groove 13*d*.

The first rotary groove 13*e* and the second rotary groove 13*f* are arranged to guide the helicoid portion 14*b* in the circumferential direction, and are mainly used during zooming.

2.4: Drive Frame

As shown in FIGS. 3 to 5 and FIG. 7, the drive frame 14 is arranged to transmit the rotary drive force transmitted from the zoom motor unit to the rotatable frame 16, and is rotatably supported by the fixed frame 13. The drive frame 14 engages the rotatable frame 16 movably in the Y axis direction and integrally rotatably. More specifically, the drive frame 14 has a substantially tubular drive frame main body 14*e*, a gear portion 14*a*, the helicoid portion 14*b*, three rectilinear guide grooves 14*d*, and a bayonet 14*c*. A bayonet 15*g* (discussed below) of the rectilinear frame 15 engages the bayonet 14*c*. The bayonet 15*g* and the bayonet 14*c* allow the drive frame 14 to move integrally in the Y axis direction and to rotate relatively with respect to the rectilinear frame 15.

The gear portion 14*a* meshes with the drive gear 12, and is arranged on the outer peripheral part of the drive frame main body 14*e*. As a result, the drive force of the zoom motor unit is transmitted through the drive gear 12 to the drive frame 14. The helicoid portion 14*b* is formed at the outer peripheral part of the drive frame main body 14*e*, and meshes with the helicoid portion 13*a* of the fixed frame 13. As shown in FIGS. 3 to 5 and FIG. 14, rectilinear guide prongs 16*a* (discussed below) of the rotatable frame 16 are inserted into the rectilinear guide grooves 14*d*.

The drive frame 14 is driven around the optical axis A (R1 side and R2 side) by the drive force of the zoom motor. For example, during start-up from a retracted state to an imaging state, the drive frame 14 is driven to the R1 side by the zoom motor unit, and the helicoid portion 14*b* moves along the helicoid portion 13*a* of the fixed frame 13. As a result, the drive frame 14 moves to the Y axis direction positive side (subject side) while rotating with respect to the fixed frame 13. That is, the drive frame 14 is advanced from the fixed frame 13.

When rotation of the drive frame 14 proceeds further, the helicoid portion 14*b* reaches the first rotary groove 13*e*, and the helicoid portion 14*b* is guided in the circumferential direction by the first rotary groove 13*e*. As a result, the drive frame 14 rotates without moving in the Y axis direction with respect to the fixed frame 13. When rotation of the drive frame 14 proceeds further, the helicoid portion 14*b* begins to mesh again with the helicoid portion 13*a* of the fixed frame 13, and the drive frame 14 moves in the Y axis direction while rotating with respect to the fixed frame 13. After this, the helicoid portion 14*b* reaches the second rotary groove 13*f*, and the helicoid portion 14*b* is guided in the circumferential direction by the second rotary groove 13*f*. As a result, the drive frame 14 rotates without moving in the Y axis direction with respect to the fixed frame 13.

Meanwhile, during transition from an imaging state to a retracted state, the drive frame 14 is driven to the R2 by the zoom motor. As a result, the drive frame 14 moves to the Y axis direction negative side while rotating with respect to the fixed frame 13. That is, the drive frame 14 is played out into the fixed frame 13.

Thus, the helicoid portion 13*a* and the helicoid portion 14*b* allow the drive frame 14 to move in the Y axis direction while rotating with respect to the fixed frame 13, and the first rotary groove 13*e*, the second rotary groove 13*f*, and the helicoid portion 14*b* allow the drive frame 14 to rotate without moving in the Y axis direction with respect to the fixed frame 13.

2.5: Rectilinear Frame

As shown in FIGS. 3 to 5, the rectilinear frame 15 is arranged to restrict the rotation of the third lens frame 20 with respect to the fixed frame 13, and is disposed on the inner peripheral side of the drive frame 14. The rectilinear frame 15 is supported to the inside in the radial direction by the drive frame 14. The rectilinear frame 15 also functions to determine the positions of the cam frame 17 and the rotatable frame 16 in the Y axis direction.

More specifically, as shown in FIGS. 3 to 5 and FIG. 8, the rectilinear frame 15 mainly has a substantially tubular rectilinear frame main body 15*a*, an annular portion 15*n*, three rotary grooves 15*b*, three cam through-grooves 15*e*, three rectilinear grooves 15*f*, three pairs of lateral grooves 15*k*, and three openings 15*m*.

The rectilinear frame main body 15*a* is arranged slidably with the inner peripheral face of the drive frame 14. The annular portion 15*n* is arranged on the outer peripheral part of the rectilinear frame main body 15*a*, and is an annular portion that protrudes outward in the radial direction from the rectilinear frame main body 15*a*. The annular portion 15*n* is disposed at the Y axis direction negative side of the rectilinear frame main body 15*a*.

Figure 8:
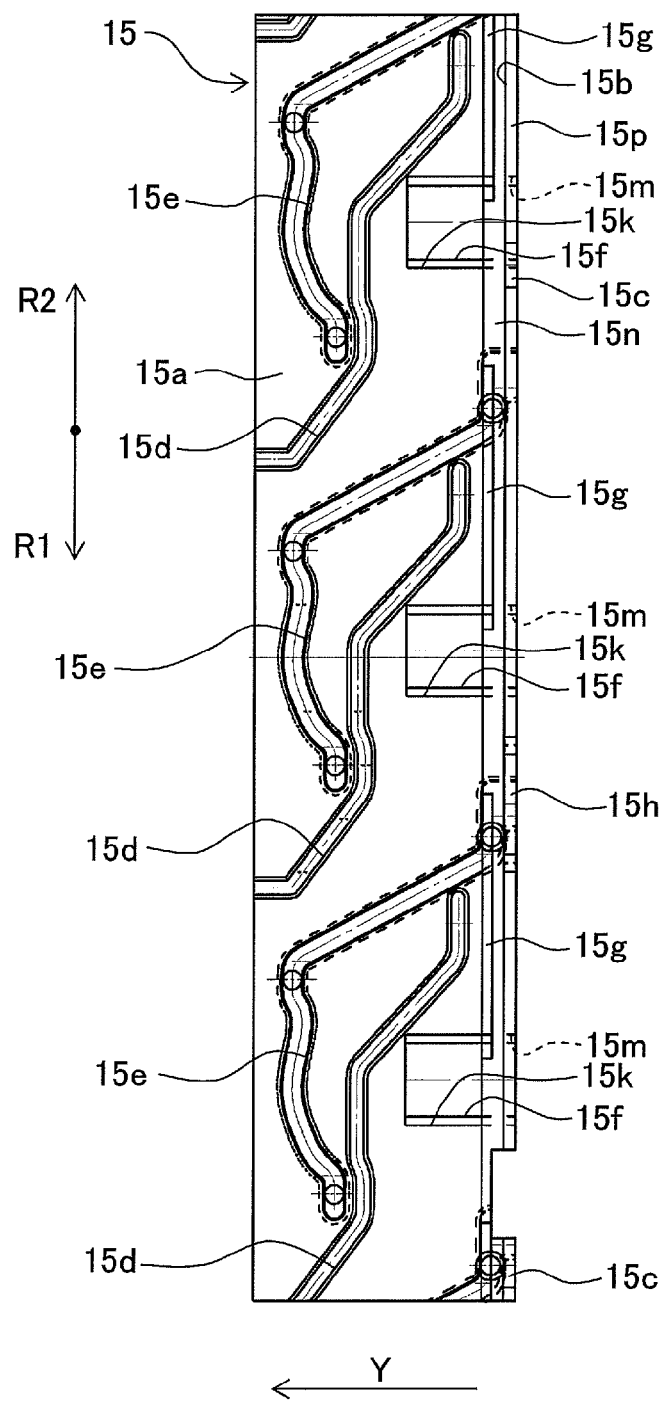
FIG. 8 is a development view of a rectilinear frame 15 as seen from the outer peripheral side.

The rotary grooves 15*b* are arranged on the outer peripheral part of the annular portion 15*n*, and are formed by three first bayonets 15*g* and a second bayonet 15*p*. The first bayonets 15*q* protrude outward in the radial direction from the annular portion 15*n*, and extend in a slender shape in the circumferential direction. As shown in FIG. 8, the three first bayonets 15*q* are disposed at a substantially equal pitch in the circumferential direction. The second bayonet 15*p* is an annular portion that protrudes outward in the radial direction from the annular portion 15*n*. As shown in FIGS. 3 to 5, the bayonet 14*c* formed on the drive frame 14 is fitted into the rotary grooves 15*b*. The rotary grooves 15*b* and the bayonet 14*c* allow the rectilinear frame 15 to move integrally in the Y axis direction and rotate with respect to the drive frame 14. For example, when the drive frame 14 rotates with respect to the fixed frame 13, the rectilinear frame 15 moves in the Y axis direction integrally with the drive frame 14, without rotating with respect to the fixed frame 13. At this point the drive frame 14 rotates with respect to the rectilinear frame 15.

Figure 14:
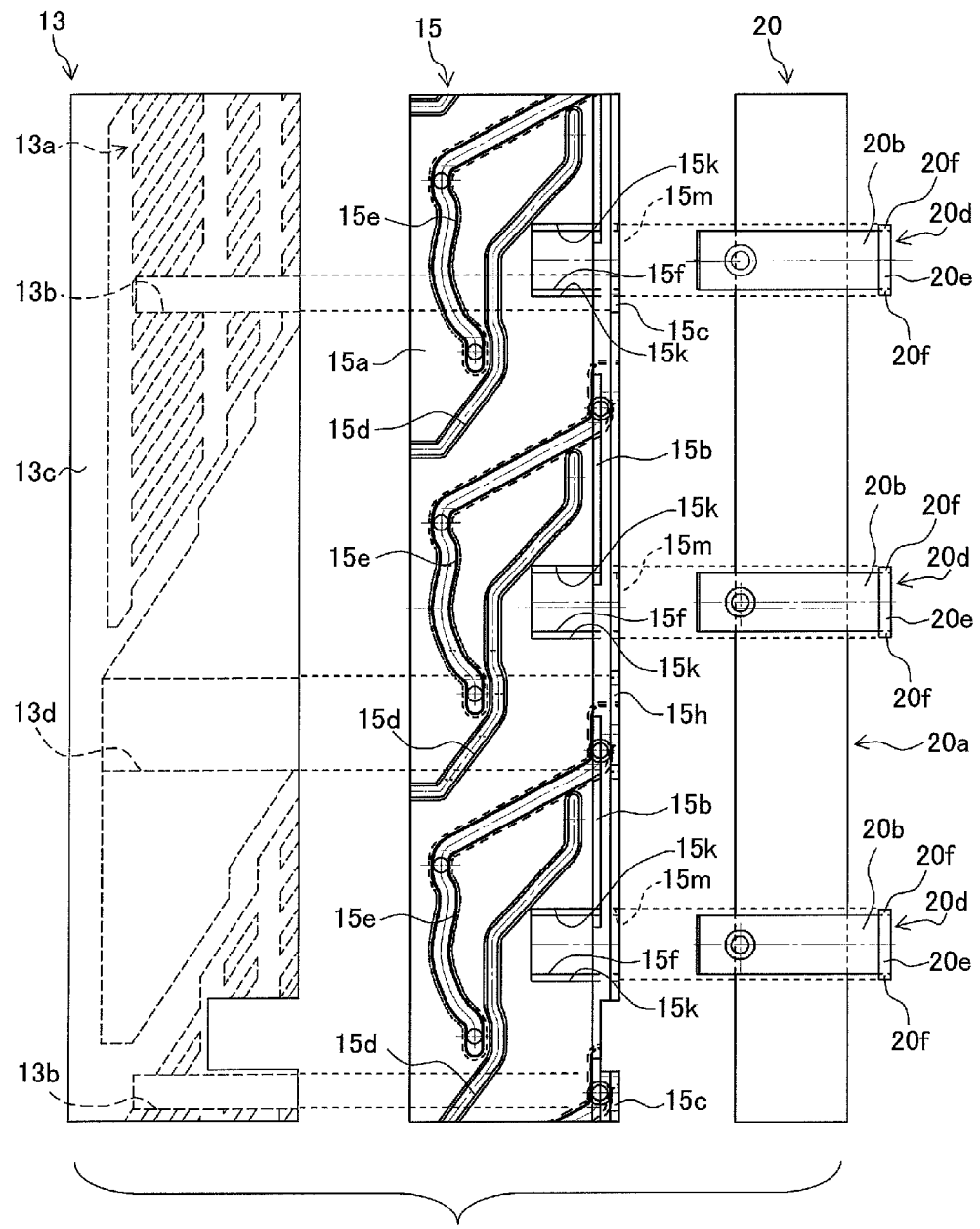
FIG. 14 is a diagram of the positional relation between the fixed frame 13, the drive frame 14, and the rotating frame 16 in the circumferential direction.

As shown in FIG. 8, the first rectilinear prongs 15c and the second rectilinear prong 15h are disposed on the Y axis direction negative side of the rectilinear frame main body 15a so as not to interfere with cam grooves 15d and cam through-grooves 15e. As shown in FIG. 14, the first rectilinear prongs 15c are inserted into the first rectilinear grooves 13b of the fixed frame 13, and are guided in the Y axis direction by the first rectilinear grooves 13b. The second rectilinear prong 15h is inserted into the second rectilinear groove 13d, and is guided in the Y axis direction by the second rectilinear groove 13d. The rotation of the rectilinear frame 15 with respect to the fixed frame 13 is restricted by the first rectilinear grooves 13b and the second rectilinear groove 13d. Specifically, the rectilinear frame 15 is supported rectilinearly in the Y axis direction by the fixed frame 13.

As shown in FIG. 8, the cam grooves 15d are used to guide the rotatable frame 16, and are disposed at the outer peripheral part of the rectilinear frame main body 15a. The three cam grooves 15d are disposed at a substantially equal pitch in the circumferential direction. As shown in FIGS. 3 to 5, cam pins 16d (discussed below) of the rotatable frame 16 engage with the cam grooves 15d.

As shown in FIG. 8, the cam through-grooves 15e are used to guide the cam frame 17, and are formed in the rectilinear frame main body 15a. The cam through-grooves 15e go through in the radial direction. The three cam through-grooves 15e are disposed at a substantially equal pitch in the circumferential direction. As shown in FIGS. 3 to 5, cam pins 17a (discussed below) of the cam frame 17 are inserted into the cam through-grooves 15e.

As shown in FIG. 8, the rectilinear grooves 15f extend in the Y axis direction, and are formed in the rectilinear frame main body 15a. The three rectilinear grooves 15f are disposed at a substantially equal pitch in the circumferential direction. As shown in FIGS. 3 to 5, the rectilinear grooves 15f go through in the radial direction. As shown in FIGS. 3 to 5 and FIG. 14, rectilinear support prongs 20d (discussed below) of the third lens frame 20 are inserted into the rectilinear grooves 15f.

As shown in FIG. 8, the pair of lateral grooves 15k are formed on both sides of the rectilinear grooves 15f in the circumferential direction, and are disposed to sandwich the rectilinear grooves 15f in the circumferential direction. The lateral grooves 15k extend in the Y axis direction along the side faces of the rectilinear grooves 15f, and have substantially the same length as the rectilinear grooves 15f. As shown in FIGS. 3 to 5, the lateral grooves 15k are formed at the outer peripheral part of the rectilinear frame main body 15a. A pair of protrusions 20f (discussed below) of the rectilinear support prongs 20d is inserted into each of the pair of lateral grooves 15k. Therefore, it can be said that the rectilinear frame 15 supports the third lens frame 20 in the radial direction.

As shown in FIGS. 3 to 5 and FIG. 8, openings 15m are substantially rectangular holes that are arranged in the annular portion 15n and go through in the Y axis direction. As shown in FIG. 8, the three openings 15m are disposed at a substantially equal pitch in the circumferential direction, and are disposed at positions respectively corresponding to the rectilinear grooves 15f. As shown in FIGS. 3 to 5, the openings 15m are linked to the rectilinear grooves 15f and the pair of lateral grooves 15k, and extensions 16c are inserted into the openings 15m in a retracted state.

2.6: Rotatable Frame

The rotatable frame 16 (an example of a rotatable frame) is arranged to transmit the rotational force of the drive frame 14 to the cam frame 17, and supports the cam frame 17 integrally rotatably and relatively movably in the optical axis direction. Also, the rotatable frame 16 is arranged rotate integrally with the drive frame 14. More specifically, as shown in FIGS. 3 to 5 and FIG. 9, the rotatable frame 16 has a substantially tubular rotatable frame main body 16e, three rectilinear guide prongs 16a, three rectilinear guide grooves 16b, three extensions 16c, and three cam pins 16d.

Figure 15:
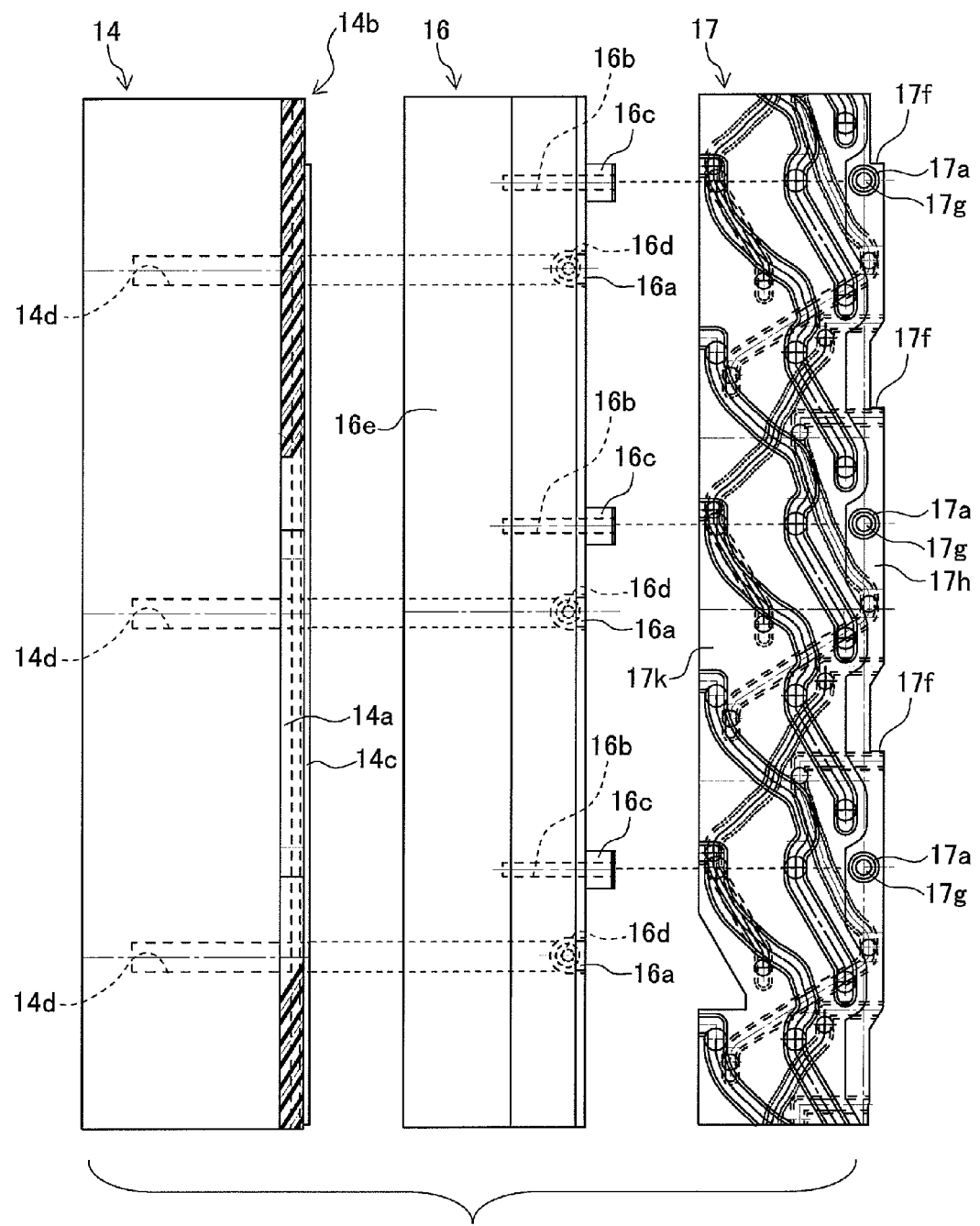
FIG. 15 is a diagram of the relation between the rotatable frame 16 and the cam frame 17.

The rectilinear guide prongs 16a are disposed on the Y axis direction negative side of the rotatable frame main body 16e, and are inserted into the rectilinear guide grooves 14d of the drive frame 14 (see FIG. 15). Consequently, the rotatable frame 16 is supported movably in the Y axis direction and integrally rotatably by the drive frame 14.

The three rectilinear guide grooves 16b are formed at the inner peripheral part of the rotatable frame main body 16e, and are disposed at a substantially equal pitch in the circumferential direction. Rectilinear guides 17g (discussed below) of the cam frame 17 are inserted into the rectilinear guide grooves 16b.

Figure 9:
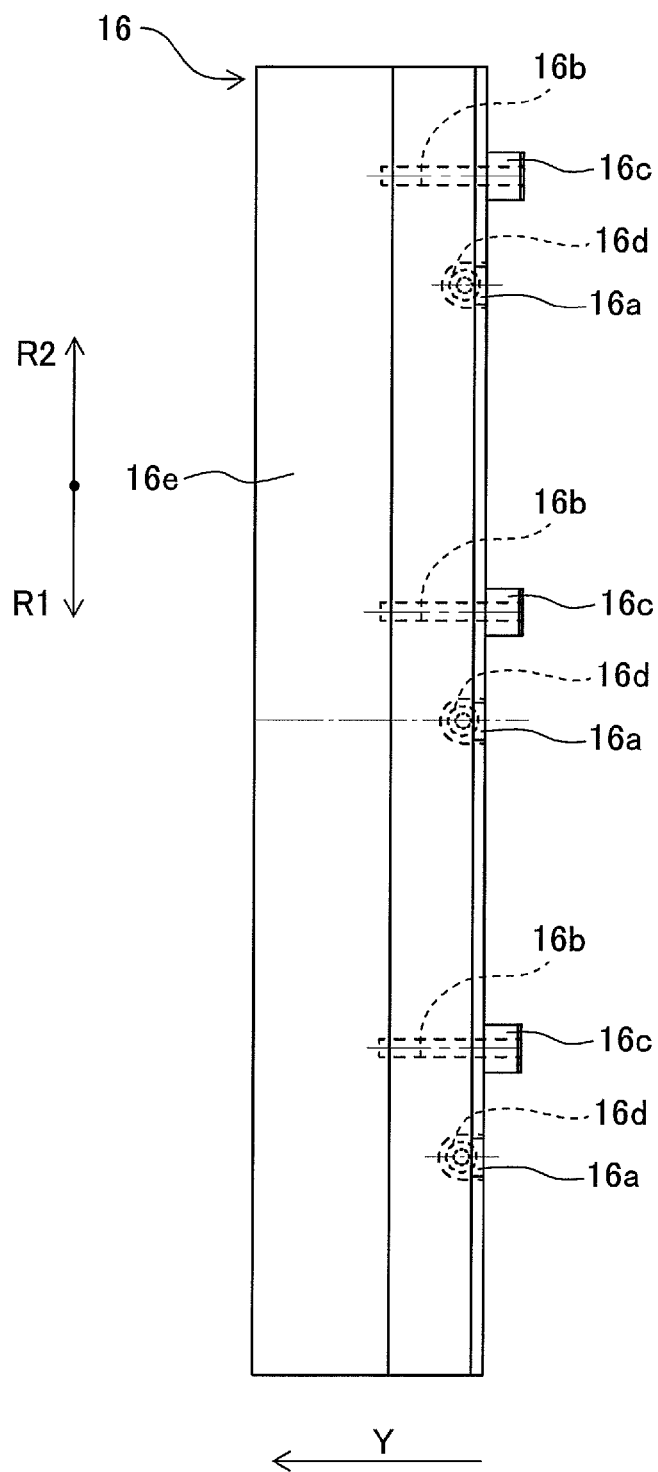
FIG. 9 is a development view of a rotatable frame 16 as seen from the outer peripheral side.

The three cam pins 16d protrude inward in the radial direction from the inner peripheral part of the rotatable frame main body 16e, and are disposed at a substantially equal pitch in the circumferential direction. As shown in FIG. 9, the cam pins 16d are disposed at substantially the same positions in the circumferential direction as the rectilinear guide prongs 16a. As shown in FIGS. 3 to 5, the cam pins 16d have a tapered shape, and are inserted into the cam grooves 15d of the rectilinear frame 15. The rotatable frame 16 is supported in the radial direction by the rectilinear frame 15 via the cam pins 16d and the cam grooves 15d.

As shown in FIGS. 3 to 5 and FIG. 9, the three extensions 16c are portions that protrude from the rotatable frame main body 16e to the Y axis direction negative side, and are disposed at substantially the same positions in the circumferential direction as the rectilinear guide grooves 16b. Since the rectilinear guide grooves 16b are formed at the extensions 16c, it can be said that the rectilinear guide grooves 16b are extended to the Y axis direction negative side by the extensions 16c. As shown in FIG. 3, in a retracted state the extensions 16c are inserted into the openings 15m formed in the annular portion 15n.

2.7: Cam Frame

The cam frame 17 is arranged to guide the first lens frame 18, the second lens frame 19, and the third lens frame 20 in the Y axis direction. As shown in FIGS. 3 to 5, the cam frame 17 is disposed on the inner peripheral side of the first lens frame 18, and is disposed on the outer peripheral side of the second lens frame 19 and the third lens frame 20.

More specifically, as shown in FIGS. 3 to 5 and FIG. 10, the cam frame 17 has a substantially tubular cam frame main body 17k, three cam pins 17a (one example of fourth cam followers), a rectilinear guide 17g, a protrusion 17h, six first cam grooves 17b, three second cam grooves 17c, three third cam grooves 17d, and three cut-outs 17f.

The cam frame main body 17k is disposed rotatably with respect to the rectilinear frame 15, and is disposed in the radial direction between a first cylindrical portion 18d (discussed below) and first guide plates 18c (discussed below). The cam frame main body 17k is also disposed in the radial direction between the first cylindrical portion 18d and the second lens frame 19, and is disposed in the radial direction between the first cylindrical portion 18*d* and the second lens frame 19, and is disposed in the radial direction between the first cylindrical portion 18*d* and the third lens frame 20.

The protrusions 17*h* is an annular portion disposed on the Y axis direction negative side of the cam frame main body 17*k*, and protrudes outward in the radial direction from the cam frame main body 17*k*.

The three cam pins 17*a* are arranged on the outer peripheral part of the cam frame main body 17*k*, and are disposed at a substantially equal pitch in the circumferential direction. More precisely, the cam pins 17*a* are arranged on the outer peripheral part of the protrusion 17*h*, and protrude outward in the radial direction from the protrusion 17*h*. The cam pins 17*a* have a tapered shape, and are inserted into the cam through-grooves 15*e* of the rectilinear frame 15. The cam frame 17 is supported in the radial direction by the rectilinear frame 15 via the cam pins 17*a* and the cam through-grooves 15*e*. When the cam frame 17 rotates with respect to the rectilinear frame 15, the cam frame 17 moves in the Y axis direction according to the shape of the cam through-grooves 15*e*.

As shown in FIGS. 3 to 5, the rectilinear guides 17*g* are columnar portions formed at the distal ends of the cam pins 17*a*, and protrude farther outward in the radial direction from the ends of the cam pins 17*a*. The rectilinear guides 17*g* engage with the rectilinear guide grooves 16*b* of the rotatable frame 16 (see FIG. 15). The rectilinear guide grooves 16*b* allow the cam frame 17 to move in the Y axis direction with respect to the rotatable frame 16 while rotating integrally with the rotatable frame 16. Furthermore, the cam through-grooves 15*e* convert the rotary motion of the cam frame 17 with respect to the rectilinear frame 15 into rectilinear motion of the cam frame 17 with respect to the rectilinear frame 15.

The six first cam grooves 17*b* are formed at the outer peripheral part of the cam frame main body 17*k*, and first cam pins 18*b* (discussed below) of the first lens frame 18 are inserted into the first cam grooves 17*b*. The three second cam grooves 17*c* and three third cam grooves 17*d* are formed at the inner peripheral part of the cam frame main body 17*k*. The first cam grooves 17*b* are arranged to guide the first lens frame 18. The first cam pins 18*b* (discussed below) of the first lens frame 18 are inserted into the first cam grooves 17*b*. The second cam grooves 17*c* are arranged to guide the second lens frame 19. Second cam pins 19*b* (discussed below) of the second lens frame 19 are inserted into the second cam grooves 17*c*. The third cam grooves 17*d* are arranged to guide the third lens frame 20. Third cam pins 20*c* (discussed below) of the third lens frame 20 are inserted into the third cam grooves 17*d*.

Figure 10:
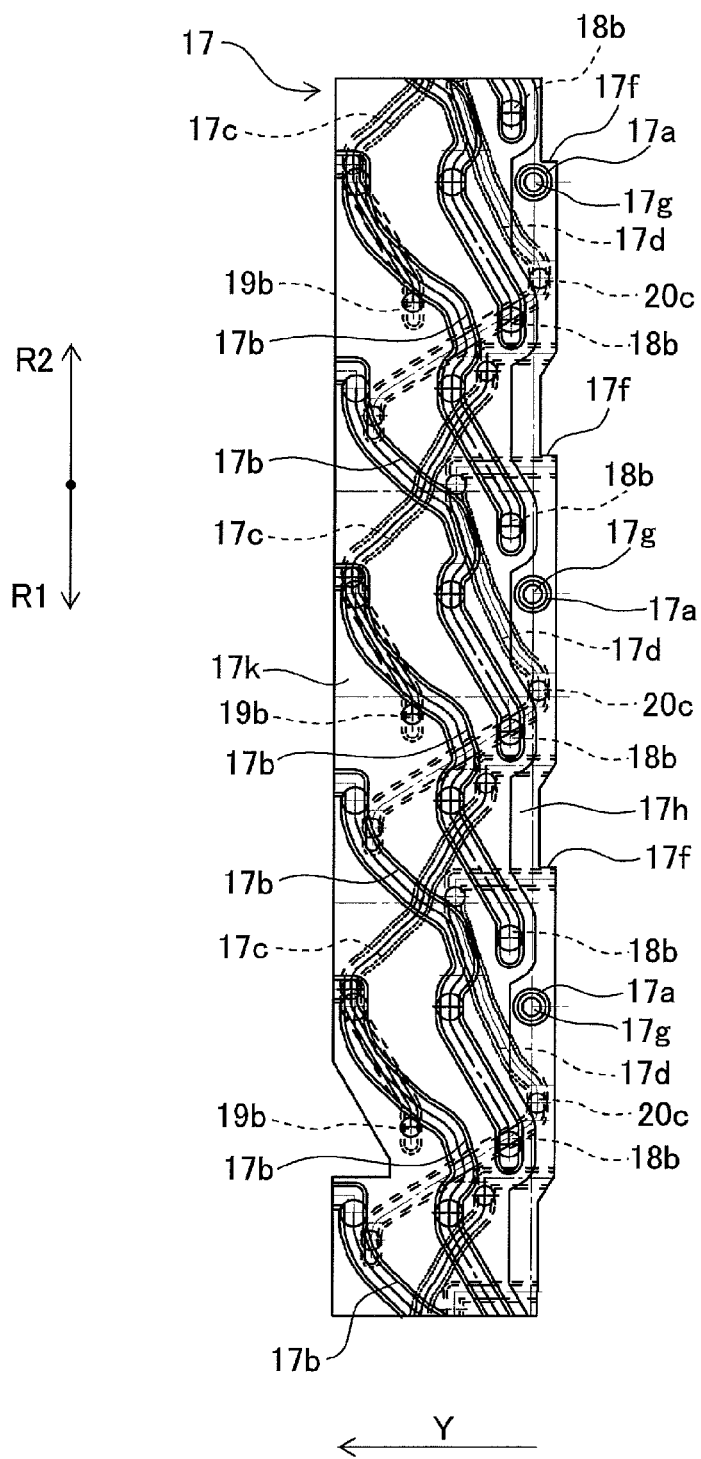
FIG. 10 is a development view of a cam frame 17 as seen from the outer peripheral side.
Figure 11:
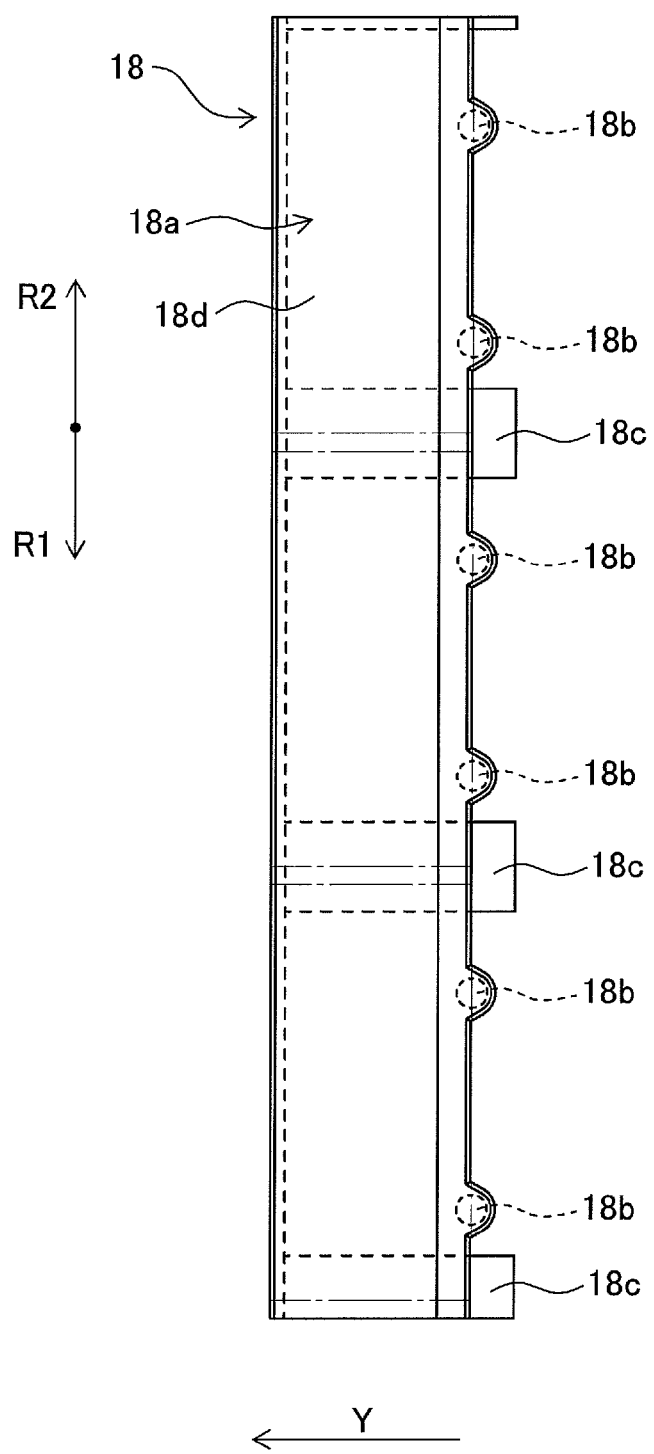
FIG. 11 is a development view of a first lens frame 18 as seen from the outer peripheral side.

As shown in FIG. 10, the cut-outs 17*f* are formed on the Y axis direction negative side of the cam frame main body 17*k*. Part of the cut-outs 17*f* is disposed between the cam pins 17*a* in the circumferential direction. That is, the cut-outs 17*f* go in between the cam pins 17*a* in the circumferential direction.

The amount of movement of the cam frame 17 in the Y axis direction with respect to the fixed frame 13 is the sum of the amount of movement of the drive frame 14 with respect to the fixed frame 13 and the amount of movement of the cam frame 17 with respect to the rectilinear frame 15.

2.8: First Lens Frame

The first lens frame 18 is arranged to support the first lens group G1, and is guided by the second lens frame 19 movably in the Y axis direction. More specifically, as shown in FIGS. 3 to 5 and FIG. 11, the first lens frame 18 has an annular first lens frame main body 18*a* (an example of a first main body), six first cam pins 18*b* (one example of a first cam follower) arranged on the inner peripheral part of the first lens frame main body 18*a*, and three first guide plates 18*c* (one example of a third rotation restrictor).

As shown in FIGS. 3 to 5, the first lens frame main body 18*a* supports the first lens group G1. More precisely, the first lens frame main body 18*a* has a substantially tubular first cylindrical portion 18*d* and a first fixed portion 18*e*. The first cam pins 18*b* are arranged on the first cylindrical portion 18*d*. The first fixed portion 18*e* is a ring-shaped portion to which the first lens group G1 is fixed, and is formed at the inner peripheral part of the first cylindrical portion 18*d*.

The first fixed portion 18*e* has a ring-shaped convex part 18*f* that is recessed to the Y axis direction positive side (subject side). Part of a second lens frame main body 19*a* (an example of a second main body) and the end of a second cylindrical portion 19*g* are accommodated in the convex part 18*f* in a retracted state and at the telephoto end. Also, the subject-side ends of second guide plates 20*b* of the third lens frame 20 are accommodated in the convex part 18*f* in a retracted state and at the telephoto end. Furthermore, the end of the second cylindrical portion 19*g* is accommodated in the convex part 18*f* in a retracted state and at the telephoto end. In other words, in a retracted state and at the wide angle end, the subject-side ends of the second guide plates 20*b* are disposed on the outside of the first lens group G1 in the radial direction.

As shown in FIGS. 3 to 5, the first cam pins 18*b* are disposed on the inner peripheral part of the first lens frame main body 18*a*, and protrude inward in the radial direction from the first lens frame main body 18*a* (more precisely, the first cylindrical portion 18*d*). The six first cam pins 18*b* are disposed at a substantially equal pitch in the circumferential direction (see FIG. 11). The first cam pins 18*b* are inserted into the first cam grooves 17*b* of the cam frame 17. The first cam pins 18*b* have a tapered shape. The first lens frame 18 is supported in the radial direction by the cam frame 17 through engagement of the first cam grooves 17*b* and the first cam pins 18*b*.

As shown in FIGS. 3 to 5 and FIGS. 17 and 18, the first guide plates 18*c* are guided slidably in the Y axis direction with first grooves 19*c*, and have a shape that is complementary with that of the first grooves 19*c*. The first guide plates 18*c* are disposed on the inner peripheral side of the first cylindrical portion 18*d*, and protrude to the Y axis direction negative side from the first fixed portion 18*e*. As shown in FIG. 3, in a retracted state the ends of the first guide plates 18*c* (more precisely, the ends of the first guide plates 18*c* on the Y axis direction negative side) are inserted into the second holes 11*d* of the base plate 11. Also, the ends of the first guide plates 18*c* (more precisely, the ends of the first guide plates 18*c* on the Y axis direction negative side) are disposed more to the Y axis direction negative side (the opposite side from the subject) than the light receiving face 22*a* in a retracted state.

2.9: Second Lens Frame

The second lens frame 19 is arranged to support the second lens group G2, and guides the first lens frame 18 movably in the Y axis direction. As shown in FIGS. 3 to 5, the second lens frame 19 is sandwiched in the radial direction by the first lens frame 18 and the third lens frame 20. The second lens frame 19 restrictions rotation of the first lens frame 18 around the optical axis A. Also, rotation of the second lens frame 19 about the optical axis A is restricted by the third lens frame 20.

As shown in FIGS. 3 to 5 and FIG. 12, the second lens frame 19 has an annular second lens frame main body 19*a*, three second cam pins 19*b* (one example of a second cam follower), three first rotation restrictors K1, three second rotation restrictors K2, and three accommodating holes 19*f*.

The second lens frame main body 19a is a portion that supports the second lens group G2, and is disposed on the inner peripheral side of the first lens frame main body 18a. The second lens frame main body 19a has a second cylindrical portion 19g and a ring-shaped second fixed portion 19h. The second cam pins 19b are arranged on the second cylindrical portion 19g. The second fixed portion 19h is formed on the inner peripheral part of the second cylindrical portion 19g, and the center part is recessed to the Y axis direction negative side (the opposite side from the subject). The second lens group G2 is fixed to the second fixed portion 19h. As shown in FIG. 3, part of the first lens group G1 goes in on the inner peripheral side of the second fixed portion 19h in a retracted state.

An annular space S is formed between the second cylindrical portion 19g and the second fixed portion 19h in the radial direction. Part of the aperture unit 30 is accommodated in the annular space S in the retracted state shown in FIG. 3. In other words, in the retracted state, part of the aperture unit 30 is disposed on the outside of the second lens group G2 in the radial direction.

The second cam pins 19b are arranged on the outer peripheral part of the second lens frame main body 19a, and protrude outward in the radial direction from the second lens frame main body 19a. More precisely, the second cam pins 19b are arranged on the outer peripheral part of the second cylindrical portion 19g, and protrude outward in the radial direction from the second cylindrical portion 19g. The second cam pins 19b engage with the second cam grooves 17c of the cam frame 17. The second cam pins 19b have a tapered shape. The second lens frame 19 is supported in the radial direction by the cam frame 17 through the second cam pins 19b and the second cam grooves 17c.

As shown in FIGS. 3 to 5 and FIG. 12, the first rotation restrictors K1 are guided slidably in the Y axis direction with the first lens frame 18, and restrict the rotation of the first lens frame 18 about the optical axis A. More specifically, the first rotation restrictors K1 have three first grooves 19c and three pairs of first protrusions 19k.

The first grooves 19c are guided slidably with the first lens frame 18 (more precisely, the first guide plates 18c), and guide the first lens frame 18 in the Y axis direction. The three first grooves 19c are disposed on the outer peripheral part of the second lens frame main body 19a, and are disposed at a substantially equal pitch in the circumferential direction. The first grooves 19c go through in the Y axis direction. The first guide plates 18c are inserted into the first grooves 19c (see FIG. 17).

The first protrusions 19k protrude to the Y axis direction positive side from the second lens frame main body 19a. The first protrusions 19k are disposed at positions corresponding to the first grooves 19c. A pair of first protrusions 19k forms part of the first grooves 19c. That is, the first grooves 19c are extended to the Y axis direction positive side by the first protrusions 19k.

The second rotation restrictors K2 are arranged slidably with the third lens frame 20, and restrict rotation of the third lens frame 20 about the optical axis A. More specifically, the second rotation restrictors K2 have three second grooves 19d and three pairs of second protrusions 19j.

The second grooves 19d are arranged slidably with the third lens frame 20 (more precisely, the second guide plates 20b), and guide the third lens frame 20 in the Y axis direction. The three second grooves 19d are disposed at a substantially equal pitch in the circumferential direction. The second grooves 19d are disposed on the opposite side from the side where the first grooves 19c are disposed, that is, on either the outer peripheral part or the inner peripheral part of the second lens frame main body 19a. In this embodiment, the second grooves 19d are disposed on the inner peripheral part of the second lens frame main body 19a. The second grooves 19d go through in the Y axis direction. The second guide plates 20b (discussed below) are inserted into the second grooves 19d (see FIG. 17).

The second protrusions 19j protrude to the Y axis direction negative side from the second lens frame main body 19a. A pair of the second protrusions 19j is disposed at a position corresponding to the second grooves 19d. A pair of the second protrusions 19j forms part of the second grooves 19d. That is, the second grooves 19d are extended to the Y axis direction positive side by the second protrusions 19j.

Figure 12:
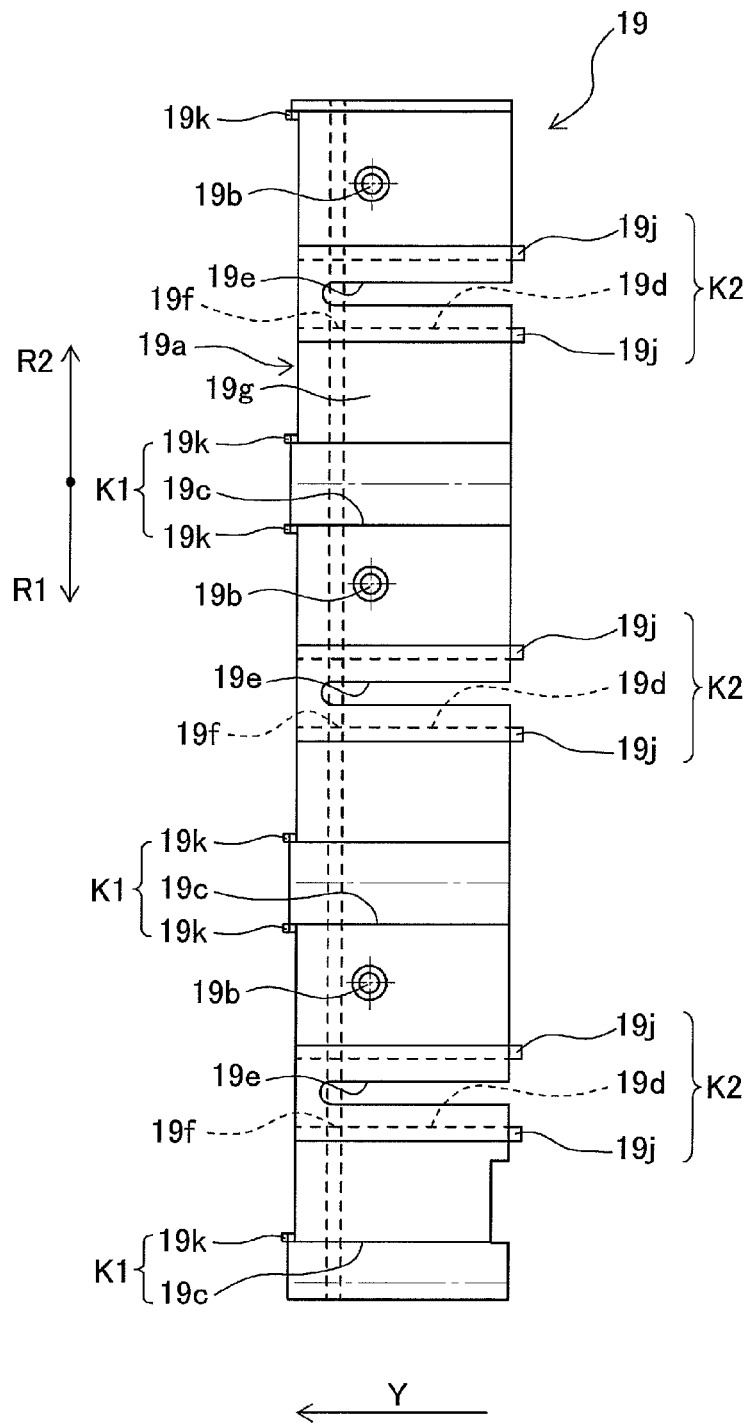
FIG. 12 is a development view of a second lens frame 19 as seen from the outer peripheral side.
Figure 17:
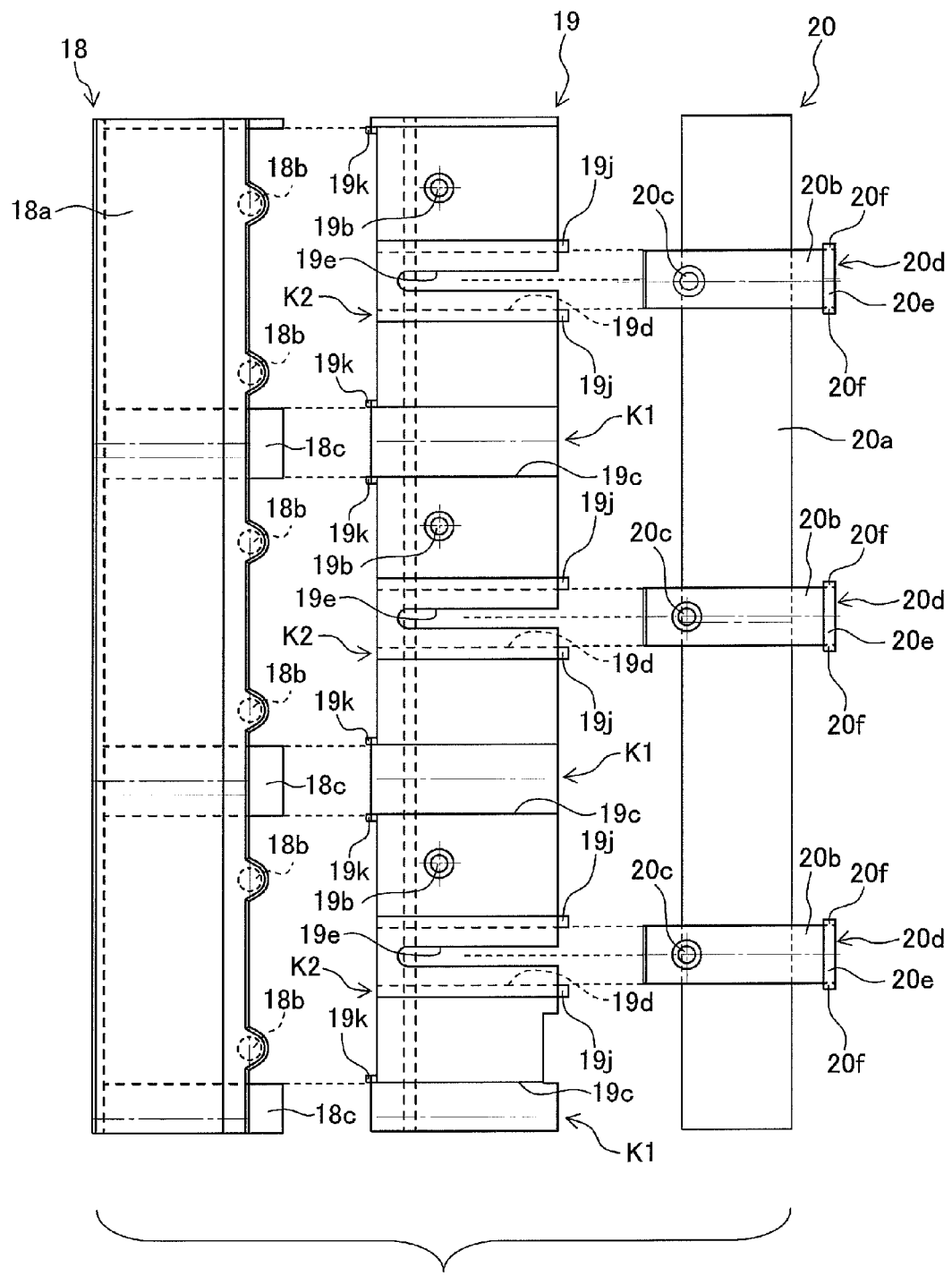
FIG. 17 is a diagram of the positional relation between the rectilinear frame 15, the cam frame 17, and the third lens frame 20 in the circumferential direction (retracted state)
Figure 18:
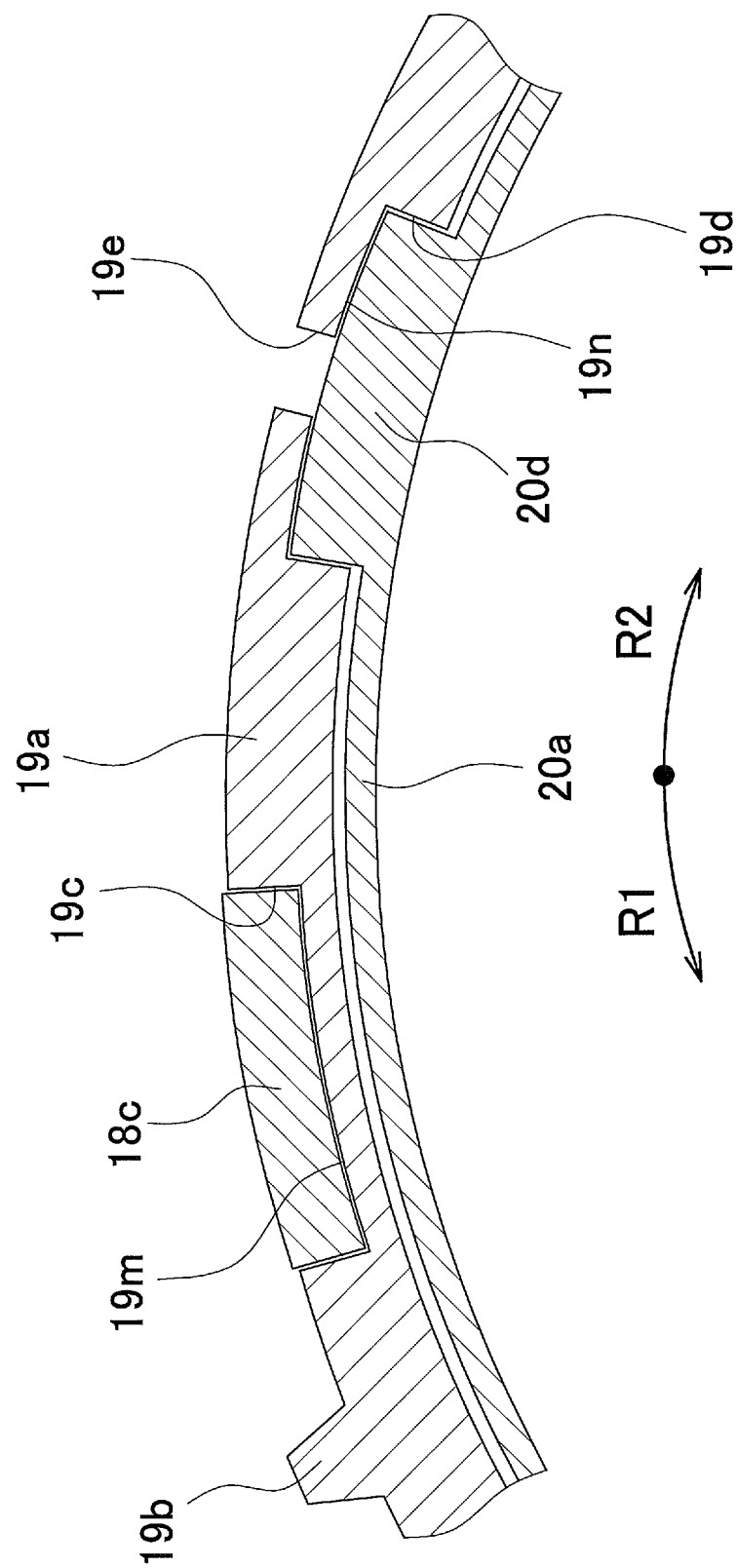
FIG. 18 is a partial cross section of the first lens frame 18, the second lens frame 19, and the third lens frame 20.

The circumferential direction position of the first grooves 19c is different from the circumferential direction position of the second grooves 19d. More specifically, as shown in FIGS. 12, 17, and 18, the first grooves 19c and the second grooves 19d are disposed alternating in the circumferential direction. The first grooves 19c are disposed between adjacent second grooves 19d. As shown in FIG. 18, part of the first grooves 19c overlaps the second grooves 19d in the circumferential direction. Here, the phrase "part of the first grooves 19c overlaps the second grooves 19d in the circumferential direction" means that when cross sections along a plane including the optical axis A are compared, part of the first grooves 19c overlaps the second grooves 19d. In other words, the phrase "part of the first grooves 19c overlaps the second grooves 19d in the circumferential direction" means that the radial direction position of the first grooves 19c is substantially the same as the radial direction position of the second grooves 19d. To put this in another way, the second grooves 19d go in between adjacent first grooves 19c. In this embodiment, first bottom faces 19m of the first grooves 19c are disposed more to the inside in the radial direction than second bottom faces 19n of the second grooves 19d. Accordingly, in the retracted state shown in FIG. 3, the first guide plates 18c substantially overlap the second guide plates 20b in the circumferential direction.

Through-grooves 19e are slender grooves extending in the Y axis direction, and are formed within the second grooves 19d. The three through-grooves 19e are disposed at a substantially equal pitch in the circumferential direction. The third cam pins 20c of the third lens frame 20 are inserted into the through-grooves 19e. The through-grooves 19e are arranged so that the third cam pins 20c will not interfere with the second lens frame 19. Accordingly, the width of the through-grooves 19e is set greater than the outside diameter of the third cam pins 20c.

The accommodating holes 19f are holes that go through in the Y axis direction, and are formed in the second fixed portion 19h. The accommodating holes 19f extend in a slender shape in the circumferential direction, and have substantially the same width (the dimension in the circumferential direction) as the second grooves 19d. The second fixed portion 19h are linked with the second grooves 19d. The ends of the second guide plates 20b (more precisely, the ends on the Y axis direction positive side) are disposed within the accommodating holes 19f in a retracted state.

2.10: Third Lens Frame

The third lens frame 20 is arranged to support the third lens group G3, and supports the second lens frame 19 movably in the Y axis direction. The third lens frame 20 is disposed on the inner peripheral side of the cam frame 17. The third lens frame 20 restricts the rotation of the second lens frame 19 about the optical axis A. Rotation of the third lens frame 20 about the optical axis A is restricted by the rectilinear frame 15.

As shown in FIGS. 3 to 5 and FIG. 13, the third lens frame 20 mainly has a third lens frame main body 20a (an example of a third main body), three second guide plates 20b (one example of a fourth rotation restrictor), three third cam pins 20c (one example of a third cam follower), and three rectilinear support prongs 20d.

The third lens frame main body 20a supports the third lens group G3, and is disposed on the inner peripheral side of the second lens frame main body 19a. More specifically, the third lens frame main body 20a has a third cylindrical portion 20g and a third fixed portion 20h. The third cylindrical portion 20g is a substantially tubular portion. The third fixed portion 20h is formed on the inner peripheral part of the third cylindrical portion 20g. The third lens group G3 is supported by the third fixed portion 20h. Also, the aperture unit 30 is fixed to the third fixed portion 20h. The aperture unit 30 is disposed on the inner peripheral side of the third cylindrical portion 20g and on the Y axis direction positive side of the third fixed portion 20h.

The second guide plates 20b are plate-like portions arranged on the outer peripheral part of the third lens frame main body 20a, and are inserted into the second rectilinear grooves 19d. The second guide plates 20b are guided slidably in the Y axis direction with the second rectilinear grooves 19d, and have a shape that is complementary with that of the second rectilinear grooves 19d. The second guide plates 20b protrude to the Y axis direction positive side and negative side from the third lens frame main body 20a. More specifically, the dimension of the second guide plates 20b in the Y axis direction is longer than the dimension of the third lens frame main body 20a in the Y axis direction. Part of the second guide plates 20b is disposed more to the Y axis direction negative side (the opposite side from the subject) than the light receiving face 22a in a retracted state.

The third cam pins 20c are arranged on the outer peripheral side of the third lens frame main body 20a. More specifically, the third cam pins 20c are disposed on the second guide plates 20b, and protrude outward in the radial direction from the second guide plates 20b. The third cam pins 20c are disposed within the through-grooves 19e, and the distal ends of the third cam pins 20c engage with the third cam grooves 17d (see FIG. 16). The distal ends of the third cam pins 20c have a tapered shape. The third lens frame 20 is supported in the radial direction by the cam frame 17 through the third cam pins 20c and the third cam grooves 17d.

Figure 19:
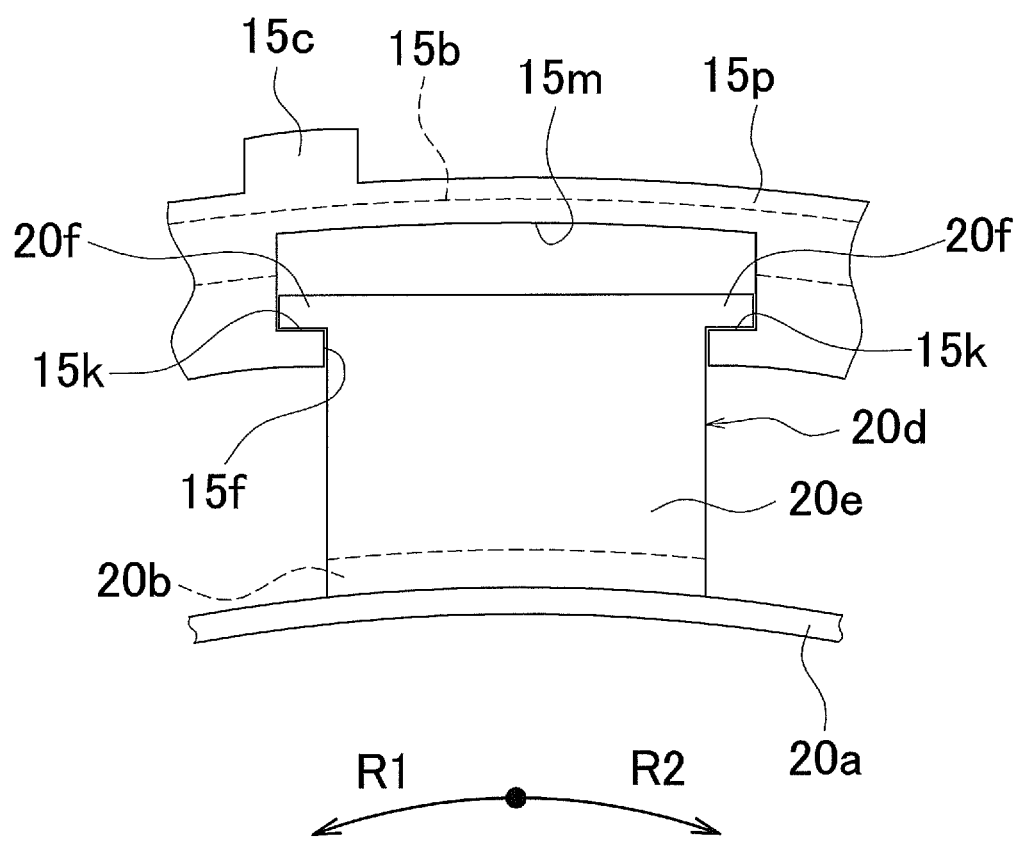
FIG. 19 is a partial plan view of rectilinear support prongs 20d and their surrounding area.

The rectilinear support prongs 20d are arranged at the ends on the Y axis direction negative side of the second guide plates 20b, and extend outward in the radial direction from the second guide plates 20b. As shown in FIGS. 3 to 5 and FIG. 16, the rectilinear support prongs 20d are engaged with the rectilinear grooves 15f. More specifically, as shown in FIG. 19, the rectilinear support prongs 20d have a prong main body 20e and a pair of protrusions 20f that protrude in the circumferential direction from the end of the prong main body 20e. The prong main bodies 20e engage with the rectilinear grooves 15f, and the pairs of protrusions 20f are disposed on the outside of the rectilinear frame 15 in the radial direction, and engage with the pairs of lateral grooves 15k arranged in the rectilinear grooves 15f. Since the rectilinear support prongs 20d are engaged with the rectilinear grooves 15f, rotation of the third lens frame 20 about the optical axis A is restricted by the rectilinear frame 15. The rectilinear frame 15 moves in the Y axis direction without rotating with respect to the fixed frame 13, so the third lens frame 20 is able to move relatively in the Y axis direction without rotating with respect to the fixed frame 13.

2.11: Fourth Lens Frame

A fourth lens frame 21 is arranged to support the fourth lens group G4 movably in the Y axis direction, and is supported movably in the Y axis direction by a focus shaft 11a of the base plate 11. The drive of the fourth lens frame 21 is performed by a focus motor 33 fixed to the base plate 11 or the fixed frame 13. More specifically, a rack 31 meshes with a lead screw 33a of the focus motor 33, and when the lead screw 33a turns, the rack 31 moves in the Y axis direction.

The rack 31 is rotatably supported by the fourth lens frame 21. A spring 32 is mounted to the rack 31. The spring 32 is a helical spring, for example. The spring 32 presses the fourth lens frame 21 to the Y axis direction positive side, and also presses the rack 31 against the lead screw 33a. The spring 32 prevents the rack 31 from chattering against the fourth lens frame 21, and also prevents the rack 31 from chattering against the lead screw 33a. When the lead screw of the focus motor 33 turns, the fourth lens frame 21 moves along with the rack 31 in the Y axis direction with respect to the base plate 11. The focus motor 33 is a stepping motor, for example.

2.12: Aperture Unit

The aperture unit 30 is used to adjust the amount of light of the optical system O, and is fixed to the third lens frame 20. Part of the aperture unit 30 is accommodated in the annular space S formed between the second cylindrical portion 19g and the second fixed portion 19h in the radial direction.

3: Operation

The operation of the lens barrel 1 will now be described through reference to FIGS. 3 to 5.

3.1: Operation at Start-up

When the power is off, the lens barrel 1 is in the retracted state shown in FIG. 3. When the user turns on the power switch 113, power is supplied to the various components, and the lens barrel 1 changes from a retracted state (FIG. 3) to an imaging state (FIG. 4). More specifically, when the drive frame 14 is rotationally driven by a specific angle to the R1 side by the zoom motor unit, the drive frame 14 is advanced to the Y axis direction positive side while rotating with respect to the fixed frame 13, and the rotatable frame 16 is advanced to the Y axis direction positive side with respect to the drive frame 14 while in synchronization with the rotation of the drive frame 14. Furthermore, the first lens frame 18 is advanced to the Y axis direction positive side with respect to the rotatable frame 16 without rotating with respect to the fixed frame 13.

More precisely, when the drive frame 14 rotates to the R1 side with respect to the fixed frame 13, the drive frame 14 is guided to the Y axis direction positive side by the helicoid portion 13a and the helicoid portion 14b. As a result, the drive frame 14 is advanced to the Y axis direction positive side while rotating with respect to the fixed frame 13. When the rotational drive of the drive frame 14 by a specific angle is finished, the helicoid portion 14b reaches the first rotary groove 13e.

Since the rectilinear guide prongs 16a are inserted in the rectilinear guide grooves 14d, when the drive frame 14 rotates to the R1 side with respect to the fixed frame 13, the rotatable frame 16 rotates along with the drive frame 14 to the R1 side with respect to the fixed frame 13. At this point, the rotatable frame 16 is able to move in the Y axis direction with respect to the drive frame 14.

Meanwhile, since the rectilinear frame 15 is rotatably linked to the drive frame 14 by the bayonet 14c and the rotary grooves 15b, when the drive frame 14 moves to the Y axis direction positive side with respect to the fixed frame 13, the rectilinear frame 15 moves along with the drive frame 14 in the Y axis direction with respect to the fixed frame 13. Since the first rectilinear prongs 15c are engaged with the first rectilinear grooves 13b, and the second rectilinear prong 15h is engaged with the second rectilinear groove 13d, the rectilinear frame 15 moves along with the drive frame 14 in the Y axis direction without rotating with respect to the fixed frame 13. Since the cam pins 16d are engaged with the cam grooves 15d, when the drive frame 14 and the rotatable frame 16 rotate with respect to the rectilinear frame 15, the cam pins 16d are guided along the cam grooves 15d. As a result, the rotatable frame 16 moves in the Y axis direction while rotating with respect to the rectilinear frame 15. At this point, the rotatable frame 16 moves in the Y axis direction while rotating integrally with respect to the drive frame 14. The amount of movement of the rotatable frame 16 in the Y axis direction with respect to the fixed frame 13 is the sum of the amount of movement of the drive frame 14 with respect to the fixed frame 13 and the amount of movement of the rotatable frame 16 with respect to the drive frame 14.

Also, when the cam frame 17 rotates along with the rotatable frame 16 with respect to the fixed frame 13, the cam pins 17a are guided by the cam through-grooves 15e. As a result, the cam frame 17 moves in the Y axis direction while rotating with respect to the fixed frame 13. The amount of movement of the cam frame 17 in the Y axis direction with respect to the fixed frame 13 is the sum of the amount of movement of the drive frame 14 (or the rectilinear frame 15) with respect to the fixed frame 13 and the amount of movement of the cam frame 17 with respect to the drive frame 14 (or the rectilinear frame 15).

When the cam frame 17 rotates with respect to the fixed frame 13, the first lens frame 18, the second lens frame 19, and the third lens frame 20 are guided in the Y axis direction by the first cam grooves 17b, the second cam grooves 17c, and the third cam grooves 17d. At this point, since the rectilinear support prongs 20d are engaged with the rectilinear grooves 15f, the rotation of the third lens frame 20 with respect to the fixed frame 13 is restricted by the rectilinear frame 15. Since the second guide plates 20b are engaged with the second rectilinear grooves 19d, the rotation of the second lens frame 19 with respect to the fixed frame 13 is restricted by the third lens frame 20. And since the first guide plates 18c are engaged with the first grooves 19c, the rotation of the first lens frame 18 with respect to the fixed frame 13 is restricted by the second lens frame 19. Therefore, the first lens frame 18, the second lens frame 19, and the third lens frame 20 move in the Y axis direction without rotating with respect to the fixed frame 13.

The amount of movement of the first lens frame 18 in the Y axis direction with respect to the fixed frame 13 is the sum of the amount of movement of the cam frame 17 with respect to the fixed frame 13 and the amount of movement of the first lens frame 18 with respect to the cam frame 17. The amount of movement of the second lens frame 19 in the Y axis direction with respect to the fixed frame 13 is the sum of the amount of movement of the cam frame 17 with respect to the fixed frame 13 and the amount of movement of the second lens frame 19 with respect to the cam frame 17. The amount of movement of the third lens frame 20 in the Y axis direction with respect to the fixed frame 13 is the sum of the amount of movement of the cam frame 17 with respect to the fixed frame 13 and the amount of movement of the third lens frame 20 with respect to the cam frame 17.

The above operation changes the lens barrel 1 from the retracted state to the imaging state. When the power is off, the lens barrel 1 changes from an imaging state to a retracted state, and the operation at this point is the reverse of that at start-up.

3.2: Zoom Operation

The zoom operation will now be described. When the user manipulates the zoom adjusting lever 114 to the telephoto side, the drive frame 14 is rotationally driven to the R1 side by the zoom motor unit by an angle corresponding to the amount of manipulation. When the zoom motor unit drives the drive frame 14 rotationally to the R1 side, the helicoid portion 14b beings to mesh with the helicoid portion 13a of the fixed frame 13, and the drive frame 14 moves in the Y axis direction while rotating from the fixed frame 13. When the drive frame 14 rotates with respect to the fixed frame 13, the rotatable frame 16 is advanced to the Y axis direction positive side while rotating with respect to the drive frame 14. Further, the first lens frame 18 is advanced to the Y axis direction positive side with respect to the rotatable frame 16 without rotating with respect to the fixed frame 13.

The operation of the various members will now be described. As rotation of the drive frame 14 by the zoom motor unit proceeds, the helicoid portion 14b begins to mesh with the helicoid portion 13a of the fixed frame 13, and the drive frame 14 moves in the Y axis direction while rotating from the fixed frame 13. After this, the helicoid portion 14b reaches the second rotary groove 13f, and the helicoid portion 14b is guided in the circumferential direction by the second rotary groove 13f. As a result, the drive frame 14 rotates without moving in the Y axis direction with respect to the fixed frame 13.

Just as at start-up, since the cam pins 16d are inserted in the cam grooves 15d, the rotatable frame 16 moves in the Y axis direction while rotating with respect to the rectilinear frame 15.

Also, when the cam frame 17 rotates along with the rotatable frame 16 with respect to the fixed frame 13, the cam pins 17a are guided by the cam through-grooves 15e. As a result, the cam frame 17 moves in the Y axis direction while rotating with respect to the fixed frame 13.

When the cam frame 17 rotates with respect to the fixed frame 13, the first lens frame 18, the second lens frame 19, and the third lens frame 20 are guided in the Y axis direction by the first cam grooves 17b, the second cam grooves 17c, and the third cam grooves 17d. At this point rotation of the third lens frame 20 with respect to the fixed frame 13 is restricted by the rectilinear frame 15, rotation of the second lens frame 19 with respect to the fixed frame 13 is restricted by the third lens frame 20, and rotation of the first lens frame 18 with respect to the fixed frame 13 is restricted by the second lens frame 19. Therefore, the first lens frame 18, the second lens frame 19, and the third lens frame 20 move rectilinearly without rotating with respect to the fixed frame 13.

Thus, the positions of the first lens frame 18, the second lens frame 19, and the third lens frame 20 can be changed, and the focal length of the optical system O adjusted, by manipulating the zoom adjusting lever 114.

4: Lens Barrel in Comparative Example

The configuration of a three-stage telescoping lens barrel will now be described as a comparative example. FIG. 12 is a simplified cross section (retracted state) of a lens barrel 201 as a comparative example.

Figure 20:
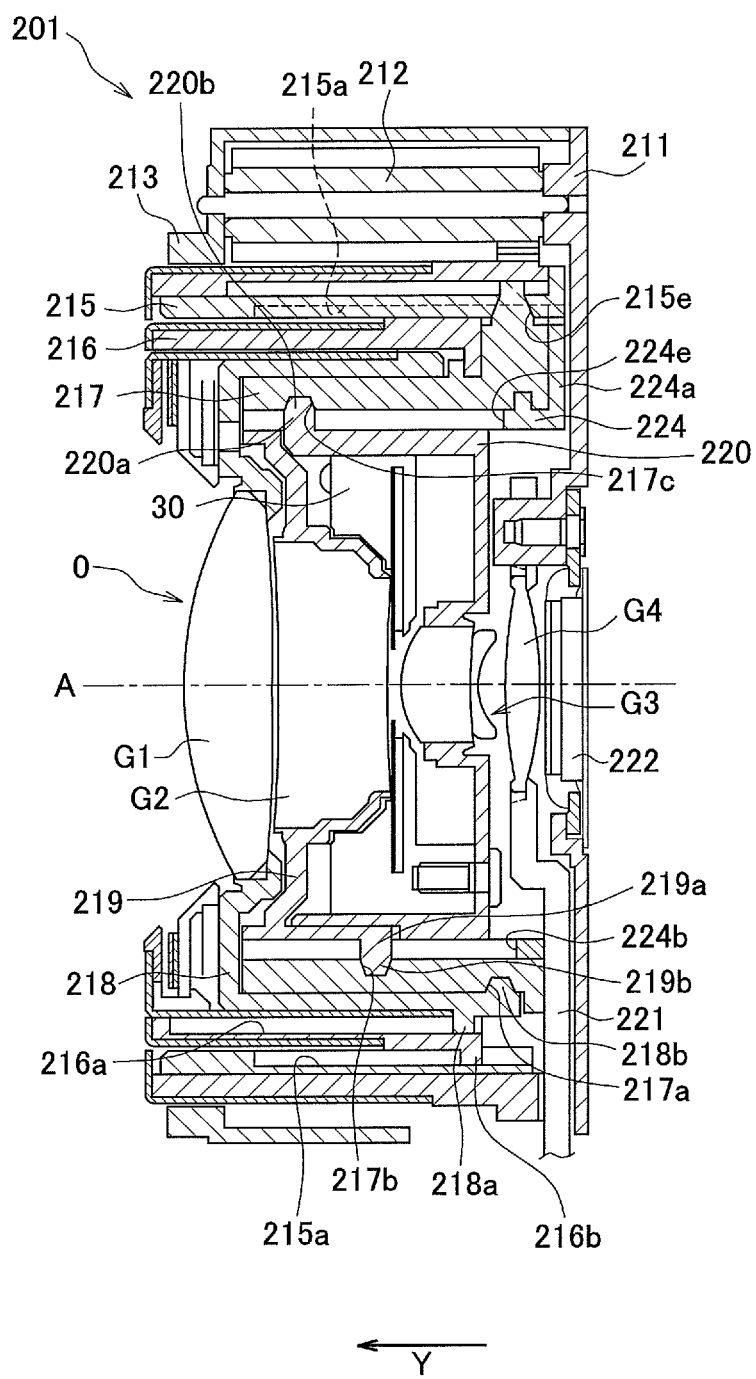
FIG. 20 is a simplified cross section of a lens barrel 101 in a comparative example (retracted state).

As shown in FIG. 20, the lens barrel 201 mainly has a base plate 211, a zoom motor unit (not shown), a fixed frame 213, a drive gear 212, a drive frame 214, a first rectilinear frame 215, a second rectilinear frame 224, a rectilinear motion frame 216, a cam frame 217, a first lens frame 218, a second lens frame 219, a third lens frame 220, and an imaging element 222. Unlike the lens barrel 1 discussed above, this lens barrel 201 has the second rectilinear frame 224.

The fixed frame 213 or the base plate 211 is fixed to a camera body 202. The imaging element 222 is attached to the base plate 211. The zoom motor unit is fixed to the fixed frame 213 or the base plate 211. The fixed frame 213 is fixed to the base plate 211. The various frames are accommodated in the space formed by the base plate 211 and the fixed frame 213. The drive force of the zoom motor unit is inputted to the drive gear 212. The first rectilinear frame 215 is supported movably in the Y axis direction by the fixed frame 213 so that it will not rotated with respect to the fixed frame 213.

With this lens barrel 201, the outer periphery of the first rectilinear frame 215 is disposed adjacent to the inner periphery of the drive frame 214. Since the first rectilinear frame 215 is coupled to the drive frame 214 with bayonet coupling, the first rectilinear frame 215 is supported integrally movably in the Y axis direction and rotatably by the drive frame 214.

The cam frame 217 is supported movably in the Y axis direction and integrally rotatably by the first rectilinear frame 215. The cam frame 217 has three first cam grooves 217a, three second cam grooves 217b, and three third cam grooves 217c. The first cam grooves 217a are used to guide the first lens frame 218. The second cam grooves 217b are used to guide the second lens frame 219. The third cam grooves 217c are used to guide the third lens frame 220. Cam pins 218b are engaged with the first cam grooves 217a. Cam pins 219b are engaged with the second cam grooves 217b. Cam pins 220b are engaged with the third cam grooves 217c.

The cam frame 217 supports the rectilinear motion frame 216 integrally movably in the Y axis direction and rotatably. Further, the cam frame 217 supports the second rectilinear frame 224 integrally movably in the Y axis direction and rotatably.

The rectilinear motion frame 216 is disposed on the outer peripheral side of the cam frame 217. The rectilinear motion frame 216 has three rectilinear cam grooves 216a and three protrusions 216b. Rectilinear guides 218a are engaged with the rectilinear cam grooves 216a. The protrusions 216b are engaged with rectilinear guide grooves 215a. With the configuration of these components, rotation of the rectilinear motion frame 216 is restricted by the first rectilinear frame 215, and the rectilinear motion frame 216 restricts rotation of the first lens frame 218.

The second rectilinear frame 224 is disposed on the inner peripheral side of the cam frame 217. The second rectilinear frame 224 has three support protrusions 224a, three first rectilinear grooves 224b, and three second rectilinear grooves 224c. The ends of the support protrusions 224a are engaged with the rectilinear guide grooves 215a. The cam pins 219b go through the first rectilinear grooves 224b. The cam pins 220b go through the second rectilinear grooves 224c. With the configuration of these components, rotation of the second rectilinear frame 224 is restricted by the first rectilinear frame 215, and the second rectilinear frame 224 restricts rotation of the second lens frame 219 and the third lens frame 220.

With the lens barrel 201 described above, the rectilinear motion frame 216 is arranged to restrict the rotation of the first lens frame 218, and the second rectilinear frame 224 is arranged to restrict the rotation of the second lens frame 219 and the third lens frame 220. Accordingly, there is an increase in the number of parts, and the lens barrel 201 ends up being larger in the radial direction. Furthermore, since the second rectilinear frame 224 is coupled to the cam frame 217 with bayonet coupling, the size of the cam frame 217 in the Y axis direction is larger. Also, since the support protrusions 224a are disposed on the Y axis direction negative side of the cam frame 217, the lens barrel 201 ends up being larger in the Y axis direction.

4: Features (1) With the lens barrel 1 pertaining to this embodiment, rotation of the third lens frame 20 about the optical axis A is restricted by the rectilinear frame 15, rotation of the second lens frame 19 about the optical axis A is restricted by the third lens frame 20, and rotation of the first lens frame 18 about the optical axis A is restricted by the second lens frame 19. With a configuration such as this, there is no need to provide a rectilinear frame (such as the rectilinear motion frame 216 and/or the second rectilinear frame 224) for restricting the rotation of the first lens frame 18 and the second lens frame 19. Therefore, this lens barrel 1 can be more compact in the radial direction.

Also, since a rectilinear frame can be omitted, there is no need to provide a bayonet for coupling the rectilinear frame to the cam frame 17, or to provide rotary grooves to the cam frame 17. Therefore, with this lens barrel 1, the size of the cam frame 17 can be smaller in the Y axis direction, which means that the product is more compact in the Y axis direction.

Thus, with the lens barrel 1 pertaining to this embodiment, a further reduction in size can be attained.

(2) As shown in FIGS. 3 to 5, the rectilinear support prongs 20d are inserted into the rectilinear grooves 15f of the rectilinear frame 15 to restrict rotation of the third lens frame 20 with respect to the fixed frame 13. The second guide plates 20b are inserted into the second grooves 19d to restrict rotation of the second lens frame 19 with respect to the third lens frame 20. The first guide plates 18c are inserted into the first grooves 19c to restrict rotation of the first lens frame 18 with respect to the second lens frame 19. Employing a configuration such as this allows the rotation of the first lens frame 18, the second lens frame 19, and the third lens frame 20 about the optical axis A to be restricted with a simple configuration.

(3) As shown in FIG. 12, since the position of the first grooves 19c in the circumferential direction is different from the position of the second grooves 19d in the circumferential direction, the first grooves 19c and the second grooves 19d can be disposed more efficiently, and the second lens frame 19 can be made more compact, than when the first grooves 19c and the second grooves 19d are in the same circumferential direction positions.

Also, as shown in FIG. 18, part of the first grooves 19c overlaps the second grooves 19d in the circumferential direction, so the size of the second lens frame 19 in the radial direction can be reduced as compared to when the first grooves 19c do not overlap the second grooves 19d in the circumferential direction.

The second grooves 19d are disposed on the opposite side from the side on which the first grooves 19c are disposed, that is, on either the outer peripheral part or the inner peripheral part of the second lens frame main body 19a. In this embodiment, the first grooves 19c are disposed on the outer peripheral part of the second lens frame main body 19a, and the second grooves 19d are disposed on the inner peripheral part of the second lens frame main body 19a. A configuration such as this improves the efficienty of the disposition of the first grooves 19c and the second grooves 19d.

The effect will be the same if the first grooves 19c are disposed on the inner peripheral part of the second lens frame main body 19a, and the second grooves 19d are disposed on the outer peripheral part of the second lens frame main body 19a.

(4) As shown in FIGS. 3 to 5, the first lens frame 18 is disposed on the outer peripheral side of the second lens frame 19, and the third lens frame 20 is disposed on the inner peripheral side of the second lens frame 19. That is, the second lens frame 19 is sandwiched between the first lens frame 18 and the third lens frame 20 in the radial direction. Accordingly, even if force in the radial direction should be exerted on the second lens frame 19 from the first lens frame 18 and the third lens frame 20, deformation of the second lens frame 19 can be kept to a minimum. Similarly, if force in the radial direction should be exerted from another lens frame, deformation can be mutually compensated for, and rigidity ensured.

(5) As shown in FIGS. 3 to 5, the cam frame 17 is disposed on the outer peripheral side of the second lens frame 19. The third lens frame 20 is disposed on the inner peripheral side of the second lens frame 19. The second lens frame 19 has slender through-grooves 19e that extend in the Y axis direction. The third cam pins 20c are disposed on the second guide plates 20b, and protrude outward in the radial direction from the second guide plates 20b. The third cam pins 20c are disposed in the through-grooves 19e.

Thus, since the third cam pins 20c are disposed on the second guide plates 20b, the through-grooves 19e are disposed in the second grooves 19d. Accordingly, the through-grooves 19e can be formed in a thinner portion, and the length of the third cam pins 20c can be increased. Therefore, the third cam pins 20c are stronger than when they are disposed on the second lens frame main body 19a.

Figure 13:
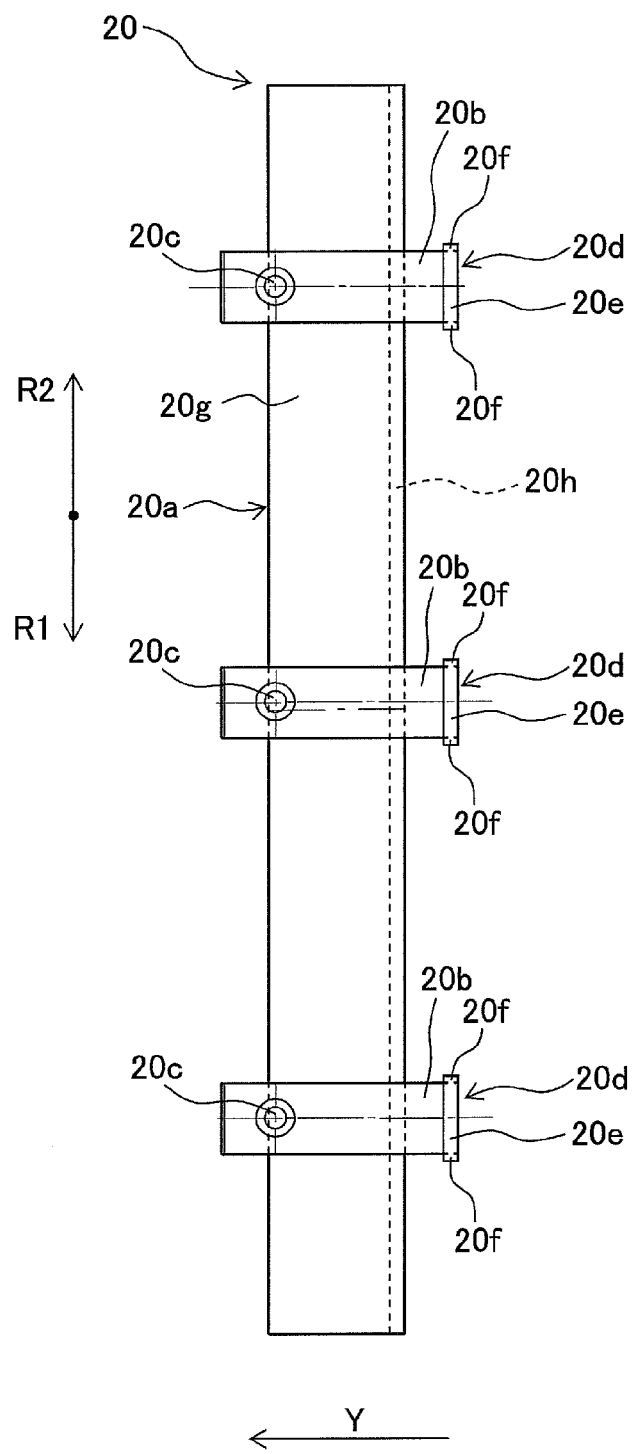
FIG. 13 is a development view of a third lens frame 20 as seen from the outer peripheral side.

(6) As shown in FIG. 13, since the second guide plates 20b protrude to both sides in the Y axis direction from the third lens frame main body 20a, the distance over which the second guide plates 20b are guided by the second grooves 19d can be longer. Consequently, the second lens frame 19 and the third lens frame 20 can be made more compact in the Y axis direction.

The same effect will be obtained if the second guide plates 20b protrude on just one side in the Y axis direction from the third lens frame main body 20a.

Figure 16:
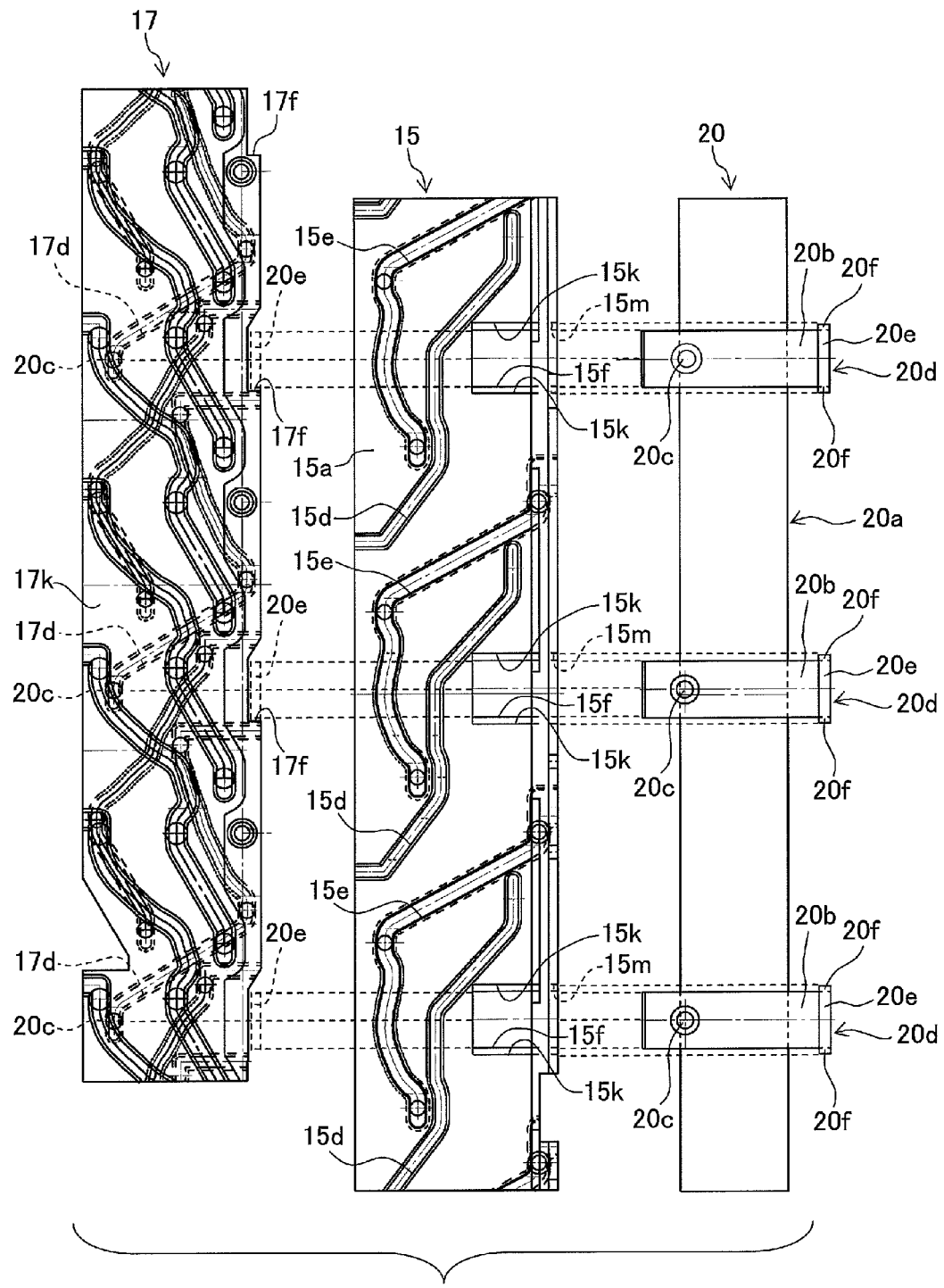
FIG. 16 is a diagram of the positional relation between the first lens frame 18, the second lens frame 19, and the third lens frame 20 in the circumferential direction.

(7) As shown in FIG. 10, the cam frame main body 17k has cut-outs 17f formed in the end of the cam frame main body 17k in the Y axis direction (more precisely, the end on the Y axis direction negative side). As shown in FIG. 16, part of the rectilinear support prongs 20d is disposed in the cut-outs 17f in a retracted state, which keeps the rectilinear support prongs 20d from making the lens barrel 1 larger in the Y axis direction.

Also, since part of the cut-outs 17f go in between the cam pins 17a in the circumferential direction, this keeps the cut-outs 17f from making the cam frame 17 larger in the Y axis direction.

(8) As shown in FIGS. 3 to 5, the first fixed portion 18e has an annular convex part 18f that is recessed on the subject side. Part of the second lens frame main body 19a (more precisely, the second fixed portion 19h of the second lens frame main body 19a) is accommodated in the Y axis direction in the convex part 18f. Also, the ends of the second guide plates 20b on the subject side are accommodated in the convex part 18f in a retracted state.

In other words, as shown in FIGS. 3 to 5, the ends of the second guide plates 20b on the Y axis direction positive side are disposed to the outside in the radial direction of the first lens group G1 in a retracted state. Also, part of the second lens frame main body 19a (more precisely, part of the second cylindrical portion 19g) is disposed to the outside in the radial direction of the first lens group G1 in a retracted state. Therefore, the space around the first lens group G1 can be utilized more effectively, and the members can be disposed more efficiently in the retracted state shown in FIG. 3.

(9) As shown in FIGS. 3 to 5, the second fixed portion 19h is recessed on the Y axis direction negative side (that is, the opposite side from the subject). Since part of the first lens group G1 goes in on the inner peripheral side of the second fixed portion 19h, the members can be disposed more efficiently in a retracted state, and the lens barrel 1 can be more compact.

(10) As shown in FIGS. 3 to 5, an annular space S is formed between the second cylindrical portion 19g and the second fixed portion 19h in the radial direction. Since part of the aperture unit 30 is accommodated in the annular space S in a retracted state, the space inside the lens barrel 1 can be utilized more effectively.

(11) As shown in FIG. 3, since part of the third lens frame 20 (more precisely, the ends of the second guide plates 20b on the Y axis direction positive side) is accommodated in the accommodating holes 19f in a retracted state, this minimizes the increase in size of the lens barrel 1, and the distance over which the second lens frame 19 is guided by the third lens frame 20 can be longer.

Also, a pair of second protrusions 19j that form part of the second grooves 19d protrude to the Y axis direction negative side from the second lens frame main body 19a. Since these second protrusions 19j are accommodated in the first holes 11c in a retracted state, this minimizes the increase in size of the lens barrel 1, and enough length can be ensured for the second grooves 19d. When the second grooves 19d are longer, the portion inserted into the second grooves 19d on the second guide plates 20b is also longer, and this minimizes chattering between the second lens frame 19 and the third lens frame 20.

Furthermore, since part of the first lens frame 18 (more precisely, the ends of the first guide plates 18c on the Y axis direction negative side) is accommodated in the second holes 11d in a retracted state, this minimizes the increase in size of the lens barrel 1, and the distance over which the first lens frame 18 is guided by the second lens frame 19 can be longer. In this case, the portion inserted into the first grooves 19c on the first guide plates 18c is longer, and chattering between the first lens frame 18 and the second lens frame 19 can be minimized.

5: Other Embodiments

The present invention is not limited to the embodiments given above, and various modifications are possible without departing from the gist of the invention or the effect of reducing the overall size the digital camera 100.

(1) In the above embodiments, the first grooves 19c were given as an example of a first guide portion, the second grooves 19d as an example of a second guide portion, the first guide plates 18c as an example of a third guide portion, and the second guide plates 20b as an example of a fourth guide portion. However, as long as the configuration is such that relative rotation is restricted between the first lens frame 18 and the second lens frame 19, the first and third guide portions can have another configuration. Also, as long as the configuration is such that relative rotation is restricted between the second lens frame 19 and the third lens frame 20, the second guide portion and the fourth guide portion can have another configuration. For example, the first guide portion can be a protrusion and the third guide portion a groove, or the second guide portion can be a protrusion and the fourth guide portion a groove.

Furthermore, the numerical quantities of the first to fourth guide portions are not limited to those in the above embodiments. One or more each of the first to fourth guide portions can be arranged.

(2) In the above embodiments, the first and second guide portions are disposed on different sides (out of either the outer peripheral part or the inner peripheral part) of the second lens frame main body 19a, but the first and second guide portions can be arranged on the same side (either the outer peripheral part or the inner peripheral part) of the second lens frame main body 19a. Also, the first guide portion can be arranged on the inner peripheral part of the second lens frame main body 19a, and the second guide portion can be arranged on the outer peripheral part of the second lens frame main body 19a.

(3) The second guide plates 20b protrude to both sides in the Y axis direction from the third lens frame main body 20a, but the second guide plates 20b can protrude to just one side in the Y axis direction from the third lens frame main body 20a.

Also, in the retracted state shown in FIG. 3, the second protrusions 19j are inserted into the first holes first holes 11c, but the second protrusions 19j and the first holes 11c can be omitted.

Furthermore, in the retracted state shown in FIG. 3, the ends of the first guide plates 18c are inserted into the second holes 11d, but the length of the first guide plates 18c can be reduced and the second holes 11d omitted.

(4) The disposition of the cam members and cam grooves is not limited to that in the above embodiments. For example, the first cam pins 18b can be arranged on the outer peripheral part of the first lens frame main body 18a, and the first cam grooves 17b can be arranged on the inner peripheral part of the cam frame main body 17k. Also, the second cam pins 19b can be arranged on the inner peripheral part of the second lens frame main body 19a, and the second cam grooves 17c can be arranged on the outer peripheral part of the cam frame main body 17k. Further, the third cam pins 20c can be arranged on the inner peripheral part of the third lens frame main body 20a, and the third cam grooves 17d can be arranged on the outer peripheral part of the cam frame main body 17k.

(5) In the above embodiments, the various cam pins are formed integrally with the tubular frame main bodies, but the cam pins can be separate members from the frame main bodies. Also, the numbers of cam pins and cam grooves is not limited to those in the above embodiments. Further, the shapes of the cam pins and cam grooves are not limited to those in the above embodiments.

(6) In the above embodiments, the description was one in which the digital camera 100 was used as an example of an imaging device, but the lens barrel 1 can be applied to another device, so long as it is a device for acquiring an image of a subject. Also, the configuration of the optical system O is not limited to that in the above embodiments. For example, the first lens group, second lens group, and third lens group can each be constituted by a single lens, or can be constituted by a plurality of lenses.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the imaging device equipped with the lens barrel. Accordingly, these terms, as utilized to describe the present invention should be interpreted relative to the imaging device equipped with the lens barrel.

The term "configured" as used herein to describe a component, section, or part of a device includes hardware and/or software that is constructed and/or programmed to carry out the desired function.

The terms of degree such as "substantially" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lens barrel comprising:
an optical system including a first lens group, a second lens group, and a third lens group sequentially arranged from a subject side;
a first frame including a first main body that supports the first lens group and at least one first cam follower formed on the outer peripheral side or inner peripheral side of the first main body and protrudes in the radial direction from the first main body;
a second frame including a second main body that supports the second lens group and at least one second cam follower formed on the outer peripheral side or inner peripheral side of the second main body and protrudes in the radial direction from the second main body, the second frame being configured to restrict rotation of the first frame about an optical axis of the optical system;
a third frame including a third main body that supports the third lens group and at least one third cam follower arranged on the outer peripheral side or inner peripheral side of the third main body and protrudes in the radial direction from the third main body, the third frame being configured to restrict rotation of the second frame about the optical axis of the optical system;
a rectilinear frame configured to restrict rotation of the third frame about the optical axis; and
a cam frame including a cam frame body rotatably disposed with respect to the rectilinear frame, at least one first cam groove formed in the cam frame body to guide one of the at least one first cam follower, at least one second cam groove formed in the cam frame body to guide one of the at least one second cam follower, and at least one third cam groove formed in the cam frame body to guide one of the at least one third cam follower.

2. The lens barrel according to claim 1, wherein
the second frame further includes at least one first rotation restrictor slidably arranged with respect to the first frame and configured to restrict rotation of the first frame about the optical axis and at least one second rotation restrictor slidably arranged with respect to the third frame and configured to restrict rotation of the third frame about the optical axis,
the first frame further includes a third rotation restrictor that has a shape complementary to and slidably arranged with respect to the at least one first rotation restrictor, and
the third frame further includes a fourth rotation restrictor that has a shape complementary to and slidably arranged with respect to the at least one second rotation restrictor.

3. The lens barrel according to claim 2, wherein
the at least one first rotation restrictor is located at a different position along the circumferential direction of the second frame than the at least one second rotation restrictor.

4. The lens barrel according to claim 2, wherein
at least part of the at least one first rotation restrictor overlaps the at least one second rotation restrictor along the circumferential direction of the second frame.

5. The lens barrel according to claim 2, wherein
the at least one first rotation restrictor is mounted on the outer peripheral side and the at least one second rotation restrictor is mounted on the inner peripheral side of the second main body, or the at least one first rotation restrictor is mounted on inner peripheral side and the at least one second rotation restrictor is mounted on the outer peripheral side of the second main body.

6. The lens barrel according to claim 5, wherein
the second frame is disposed between the first frame and the third frame along the radial direction.

7. The lens barrel according to claim 6, wherein
the at least one first rotation restrictor is arranged on the outer peripheral side of the second main body, and
the at least one second rotation restrictor is arranged on the inner peripheral side of the second main body.

8. The lens barrel according to claim 7, wherein
the cam frame is disposed along the radial direction between the first main body and the third rotation restrictor,
the at least one first cam follower is disposed on the inner peripheral side of the first main body and protrudes inwardly in the radial direction from the first main body, and
the at least one first cam groove is disposed on the outer peripheral side of the cam frame body.

9. The lens barrel according to claim 7, wherein
the second frame further includes a slender through-groove formed in the at least one second rotation restrictor and extends along the optical axis, and
the at least one third cam follower is mounted on the fourth rotation restrictor and passes through the through-groove.

10. The lens barrel according to claim 9, wherein
the cam frame is disposed on the outer peripheral side of the second frame,
the third frame is disposed on the inner peripheral side of the second frame, and
the at least one third cam follower protrudes outwardly in the radial direction from the fourth rotation restrictor.

11. The lens barrel according to claim 7, wherein
the at least one first rotation restrictor further includes a first groove that extends along the optical axis direction,
the at least one second rotation restrictor further includes a second groove that extends along the optical axis direction,
the third rotation restrictor is inserted into the first groove, and
the fourth rotation restrictor is inserted into the second groove.

12. The lens barrel according to claim 11, wherein
the at least one first rotation restrictor further includes a pair of first protrusions that extend along the optical axis from the second main body and configured to guide the first frame along the optical axis, the pair of first protrusions forming a part of the first groove.

13. The lens barrel according to claim 11, wherein
the at least one second rotation restrictor further includes a pair of second protrusions that extend along the optical axis from the second main body and configured to guide the third frame along the optical axis, the pair of second protrusions forming a part of the second groove.

14. The lens barrel according to claim 7, wherein
the fourth rotation restrictor extends beyond the third main body in at least one direction along the optical axis.

15. The lens barrel according to claim 7, wherein
the third frame further includes a rectilinear support member that extends outwardly in the radial direction from the fourth rotation restrictor,
the rectilinear frame includes a rectilinear groove to guide the third lens frame along the optical axis, the rectilinear support member is configured to be inserted into the rectilinear groove.

16. The lens barrel according to claim 15, wherein
the cam frame further includes a cut-out portion formed on the end of the cam frame body and extends along the optical axis, the cut-out portion accommodating at least part of the rectilinear support member when the lens barrel is in a retracted state.

17. The lens barrel according to claim 16, wherein
the cam frame further includes a plurality of fourth cam followers arranged on the outer peripheral side or on the inner peripheral side of the cam frame body and extend in the radial direction from the cam frame body,
the rectilinear frame further has a plurality of fourth cam grooves into which the respective fourth cam followers are inserted, and
the cut-out portion is located along the circumferential direction of the cam frame between the fourth cam followers.

18. The lens barrel according to claim 11, wherein
the second main body defines an accommodating hole transverse to the optical axis, the accommodating hole accommodates part of the fourth rotation restrictor when the lens barrel is in a retracted state.

19. The lens barrel according to claim 11, wherein
the first main body has a first cylindrical portion on which the at least one first cam follower is arranged and a ring-shaped first fixed portion formed on the inner peripheral side of the first cylindrical portion, the first lens group is fixed to the first fixed portion, and
the third rotation restrictor is mounted on the inner peripheral side of the first cylindrical portion and extends along the optical axis from the first fixed portion.

20. The lens barrel according to claim 2, wherein
an end of the fourth rotation restrictor on the subject side is positioned along the radial direction on the outside of the first lens group when the lens barrel is in a retracted state.

21. The lens barrel according to claim 1, wherein
part of the second main body is positioned along the radial direction on the outside of the first lens group when the lens barrel is in a retracted state.

22. The lens barrel according to claim 1, wherein
the second main body has a second cylindrical portion on which the at least one second cam follower is arranged and a ring-shaped second fixed portion formed on the inner peripheral side of the second cylindrical portion, the second lens group is fixed to the second fixed portion, and
an end of the second cylindrical portion is positioned on the outside of the first lens group along the radial direction when the lens barrel is in a retracted state.

23. The lens barrel according to claim 22, wherein
the second fixed portion is recessed within the second main body and away from the subject side, and
at least part of the first lens group is positioned within the inner peripheral side of the second fixed portion when the lens barrel is in the retracted state.

24. The lens barrel according to claim 22, wherein
the second fixed portion is recessed within the second main body and away from the subject side, and
at least part of the first lens group is positioned within the inner peripheral side of the second fixed portion when the lens barrel is between a wide angle state and the retracted state.

25. The lens barrel according to claim 1, wherein
the second main body has a second cylindrical portion on which the at least one second cam follower is arranged and a ring-shaped second fixed portion formed at the inner peripheral part of the second cylindrical portion, the second lens group is fixed to the second fixed portion, the second fixed portion is recessed within the second main body and away from the subject side, and
at least part of the first lens group is positioned within the inner peripheral side of the second fixed portion when the lens barrel is in a retracted state.

26. The lens barrel according to claim 25, wherein
at least part of the first lens group is positioned within the inner peripheral side of the second fixed portion when the lens barrel is between a wide angle state and a retracted state.

27. The lens barrel according to claim 25, further comprising
an aperture unit fixed to the third lens frame to adjust the amount of light to the optical system,
wherein an annular space is formed between the second cylindrical portion and the second fixed portion in the radial direction, and at least part of the aperture unit is disposed within the annular space when the lens barrel is in the retracted state.

28. The lens barrel according to claim 1, wherein
the second main body has a second cylindrical portion on which the at least one second cam follower is arranged and a ring-shaped second fixed portion formed on the inner peripheral side of the second cylindrical portion, the second lens group is fixed to the second fixed portion which is recessed within the second main body and away from the subject side, and
at least part of the first lens group is positioned within the inner peripheral side of the second fixed portion when the lens barrel is between a wide angle state and a retracted state.

29. The lens barrel according to claim 28, further comprising
an aperture unit fixed to the third lens frame to adjust the amount of light to the optical system,
wherein an annular space is formed between the second cylindrical portion and the second fixed portion in the radial direction, and
at least part of the aperture unit is positioned within the annular space when the lens barrel is between the wide angle state and the retracted state.

30. The lens barrel according to claim 1, further comprising
an imaging element including a light receiving face configured to receives an optical image of the subject, the imaging element being configured to convert the optical image into an electrical signal; and
a stationary member configured to support the imaging element,
wherein at least one of an end portion of the first frame and an end portion of the third frame being positioned on the opposite side of the light receiving face away from the subject side when the lens barrel is in a retracted state.

31. The lens barrel according to claim 30, wherein
the stationary member includes at least one first hole that extends along the optical axis, the first hole accommodating part of the second frame when the lens barrel is in the retracted state.

32. The lens barrel according to claim 31, wherein
the stationary member further includes at least one second hole that extends along the optical axis, the second hole accommodating part of the first lens group when the lens barrel is in the retracted state.

33. The lens barrel according to claim 1, further comprising
a rotatable frame configured to support rotatable and axial movement of the cam frame along the optical axis; and
a drive frame configured to transmit a rotary drive force to the rotatable frame and to support rotatable and axial movement of the rotatable frame along the optical axis,
wherein the rectilinear frame is rotatable with respect to the drive frame and movable along the optical axis.

34. The lens barrel according to claim 1, wherein
the second main body is disposed on the inner peripheral side of the first main body, and
the third main body is disposed on the inner peripheral side of the second main body.

* * * * *